(12) United States Patent
Scoville et al.

(10) Patent No.: US 6,618,360 B1
(45) Date of Patent: Sep. 9, 2003

(54) METHOD FOR TESTING DATA PATH OF PERIPHERAL SERVER DEVICES

(75) Inventors: Dean L. Scoville, Auburn, CA (US); Patrick A. Bueb, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/333,362

(22) Filed: Jun. 15, 1999

(51) Int. Cl.[7] .................................................. H04J 1/16
(52) U.S. Cl. ...................................................... 370/248
(58) Field of Search ................................ 370/229, 235, 370/241, 242, 243, 244, 245, 246, 247, 248, 249, 250, 251, 253; 709/224

(56) References Cited

U.S. PATENT DOCUMENTS

| | | | | |
|---|---|---|---|---|
| 5,477,531 A | * | 12/1995 | McKee et al. | 370/249 |
| 5,537,550 A | * | 7/1996 | Russell et al. | 709/224 |
| 5,732,213 A | * | 3/1998 | Gessel et al. | 370/235 |
| 5,931,961 A | * | 8/1999 | Ranganathan et al. | 340/514 |
| 5,966,510 A | * | 10/1999 | Carbonneau et al. | 710/18 |
| 5,982,753 A | * | 11/1999 | Pendleton et al. | 370/252 |
| 6,002,671 A | * | 12/1999 | Kahkoska et al. | 348/192 |
| 6,067,407 A | * | 5/2000 | Wadsworth et al. | 709/224 |
| 6,272,148 B1 | * | 8/2001 | Takagi et al. | 370/469 |

OTHER PUBLICATIONS

W. Richard Stevens, TCP/IP Illustrated vol. 1: The Protocols,Jan. 1999, Addison–Wesley, 13th Printing,pp. 69–96.*
Mills, D.L., The Fuzzball, Proc. ACM SIGCOMM 88 Symposium, Aug. 1988, 115–122.*
Postel, J., RFC 792—Internet Control Message Protocol, Sep. 1981, 1–22.*

* cited by examiner

*Primary Examiner*—Wellington Chin
*Assistant Examiner*—William Schultz

(57) ABSTRACT

A method for testing a data path of a server operably connected between at least one peripheral device and at least one client device via a network includes independently testing one of a peripheral interface portion of the data path and a network interface portion of the data path, and generating a status report indicating the result of the test.

43 Claims, 18 Drawing Sheets

METHOD FOR TESTING DATA PATH OF PERIPHERAL SERVER DEVICES

The present invention generally relates to a method for testing peripheral servers, and more particularly to a method for testing the performance of the data paths of a server which is operably connected to peripherals or multi-function peripherals that are adapted to be connected to a network system.

In any given network, especially in an office environment, it is common to find peripherals such as a printer and/or a scanner connected to the network. This arrangement allows a number of computers that are attached to the network to share the services of the network printer and/or the scanner. Recently, multi-function peripherals (MFP) have been introduced, which combine printing, scanning and other functions into a single peripheral.

A peripheral is typically connected to the network via a dedicated server, which allows the users on the network to share the peripheral. The server includes a data path or gateway that provides network access to the peripheral functions, such as scanning and printing. The primary purpose of the gateway is to simply pass data back and forth between the network and the peripheral. Therefore, it is desirable to test the gateway so that its performance can be measured.

Conventionally, the performance of the server in receiving and sending data is measured over the entire gateway. This involves initiating a function and measuring the performance by dividing the total amount of data sent through the server by the total amount of time required for the server to receive and transmit the data. Although this method provides an accurate measurement for overall throughput (performance), it is incapable of identifying the performance characteristics of individual portions of the gateway. For example, if the rate at which the server received data were much faster than the rate at which it could transmit the data, there would be a "bottleneck" of data at the portion of the gateway which transmits the received data. Thus, the conventional measurement would only be able to detect the overall data rate of the gateway, but not the data rate of the specific portions. Understanding the performance characteristics of the individual portions of a data path or gateway enables the designers of peripheral servers to more easily and efficiently make internal design changes that will improve the overall performance of their products.

Accordingly, it is a primary objective of the present invention to provide an improved method for independently testing different portions of a gateway.

Another objective of the present invention is to provide such an improved method for separately measuring the performance of a network interface portion and a peripheral interface portion of a gateway.

Still another object of the present invention is to provide such an improved method for measuring the performance effects of modifying the maximum packet size of data transmitted through a gateway.

Yet another object of the present invention is to provide such an improved method for measuring the ability of a gateway to quickly and repeatedly open and close communication with a peripheral.

A further object of the present invention is to provide such an improved method for generating a status report containing the test results of the above-described measurements.

Other objects and advantages will become apparent upon reading the following detailed description, in conjunction with the attached drawings, in which.

TABLE OF ACRONYMS

The patent utilizes several acronyms. The following table is provided to aid the reader in determining the meaning of the several acronyms:

ASCII=American Standard Code for Information Interchange
BIO=Bitronics Input/Output
BP=Backplane Performance
BT=Backplane Toggle
CA=Cancel
FP=Frontplane Performance
MFP=Multi-function Peripheral
MLC=Multiple Logical Channel
MSS=Maximum Segment Size
MS=Maximum Segment
PML=Peripheral Management Language
RE=Reset SGW=Scan Gateway
SPX=Sequenced Packet Exchange
SQ=Status Query
TCP=Transmission Control Protocol

DETAILED DESCRIPTION

The present invention is directed to a method for testing a data path or gateway in a dedicated peripheral server for passing data to and from a network peripheral or a multi-function peripheral (MFP). The method allows the network interface portion and the peripheral interface portion of the gateway to be tested independently and under different data packet size requirements.

Broadly stated, the present invention is directed to a method for testing a data path of a server that is operably connected between at least one peripheral device and a network. The data path is adapted to transmit data between the peripheral device and the network. The method includes first testing one of the peripheral interface portion and the network interface portion of the data path. A status report is generated indicating the test results of the first test. Then, a separate test is performed on the other of the peripheral interface portion and the network interface portion of the data path. A status report is then generated indicating the test results of the second test.

Figure 1:
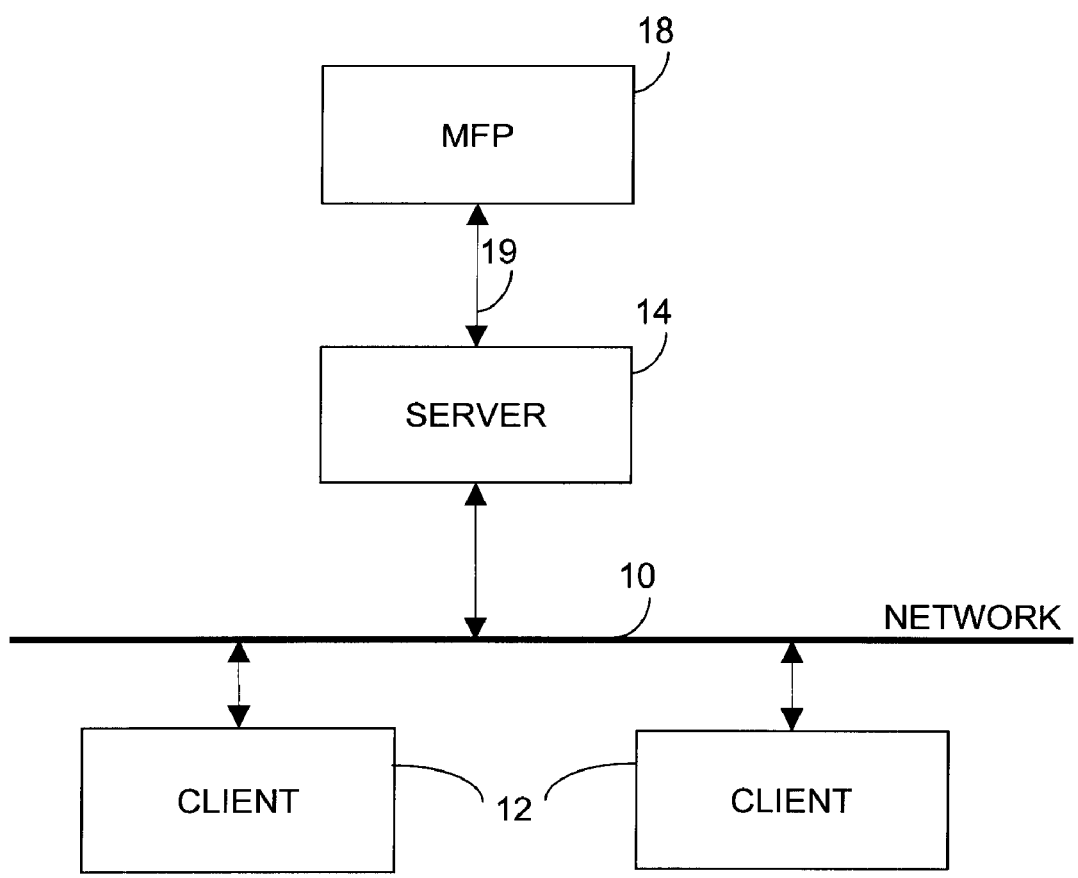
FIG. 1 is a block diagram of a network system in which the present method is implemented.
Figure 2:
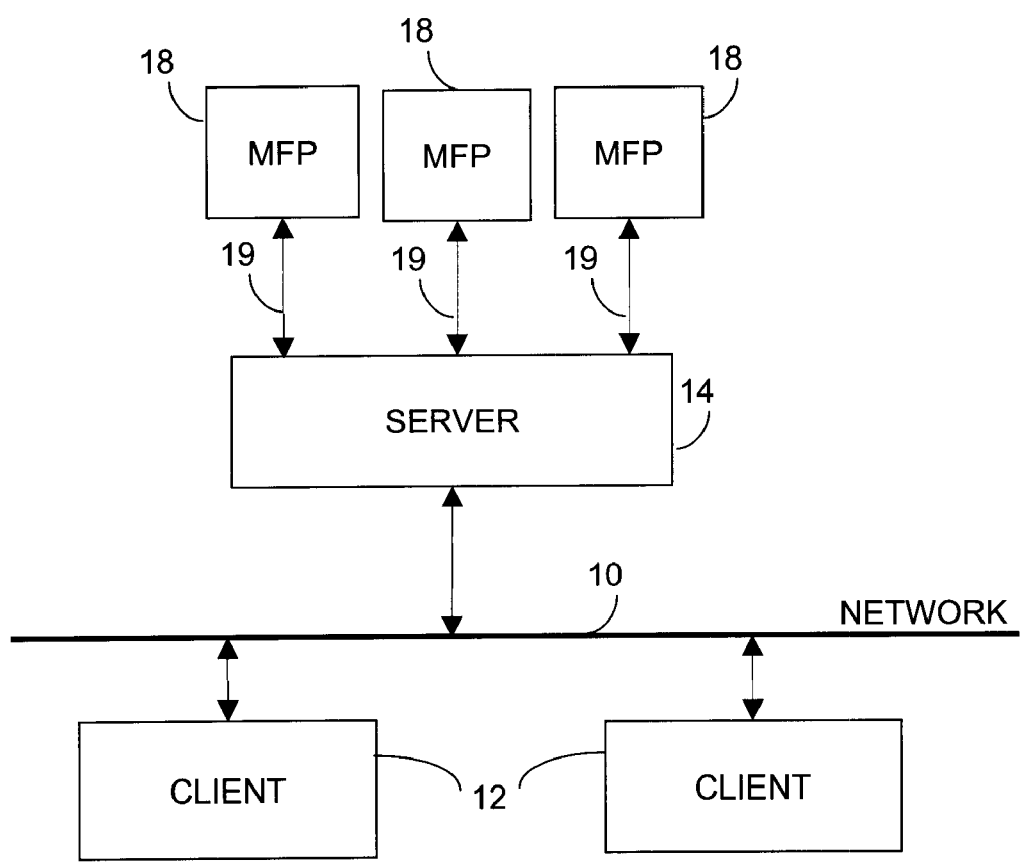
FIG. 2 is a block diagram of a network system with a peripheral server attached to a plurality of peripherals in which the present method is implemented.

Turning now to FIG. 1, the network in which the present method is implemented is generally indicated at 10, and includes a plurality of client computers 12 (two shown) and a dedicated peripheral server 14 connected to the network. In the preferred embodiment, a multi-function peripheral (MFP) 18 which performs printing, scanning and other functions is connected to the peripheral server 14 via a parallel cable 19. Turning to FIG. 2, it should be noted that server 14 may also be connected to a single-function peripheral such as a printer or a scanner, or to a plurality of multi-function peripherals (MFP) 18, printers or scanners, each connected to the server 14 by a separate parallel cable 19. Those of ordinary skill in the art will recognize that the required connectivity between the peripheral 18 and the server 14 can be realized using other means such as serial cables and protocols.

Figure 3:
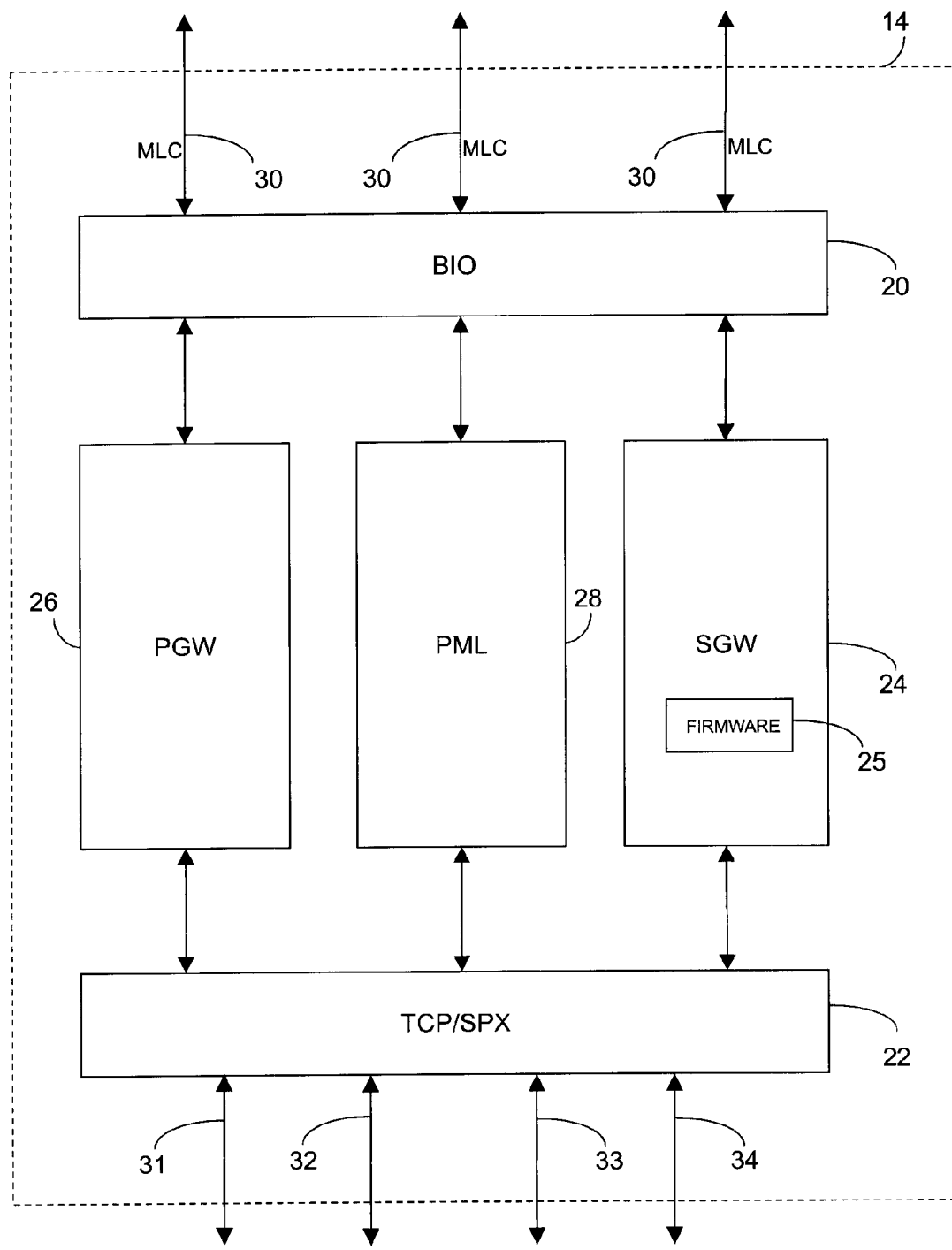
FIG. 3 is a block diagram of the server in FIG. 1 including a scan gateway.

Turning to FIG. 3, the preferred peripheral server 14 is adapted to be operably connected to the MFP 18, and includes a Bitronics I/O (BIO) interface 20 which connects to the MFP 18, and a transmission control protocol (TCP) and/or sequenced packet exchange (SPX) interface 22 to the network 10. In the preferred embodiment, a scan gateway (SGW) 24 and a print gateway (PGW) 26 are connected between the BIO interface 20 and the TCP/SPX interface 22. Also connected between the BIO interface 20 and the TCP/SPX interface 22 is a firmware, which preferably employs Peripheral Management Language (PML) 28 to control the functions of the MFP 18. The TCP/SPX interface 22 on the preferred server 14 provides network connectivity via a plurality of network ports, including SGW scan ports 31, SGW test ports 32, PGW print ports 33 and other ports 34. Those of ordinary skill in the art will recognize that the required network connectivity can be realized using other network protocols and port combinations.

While the present method is generally directed to any gateway of the server 14, it is most preferably directed to the scan gateway (SGW) 24, which transmits scan data between the MFP 18 and the network 10. As such, the following method is described with respect to the SGW 24.

In the present invention, three tests are performed on the SGW 24 of the peripheral server 14. A Backplane Performance (BP) test measures the amount of time required for the server 14 to receive a specified number of bytes of scan data from the MFP 18 via the BIO interface 20. In this test, the data is discarded once received to eliminate internal processing time. A status report containing the test results of the BP test is sent via a test port connection to the network 10 upon completion of the test. Another test is a Frontplane Performance (FP) test which causes the server 14 to generate a specified number of bytes of test data and send them on the TCP/SPX interface 22 to the network 10. Similar to the BP test, a status report is generated when the test is completed. In both the BP and the FP tests, the target (maximum) byte counts are specified at the start of each test by means of command parameters. Yet another test is a Backplane Toggle (BT) test which measures the ability of the peripheral server 14 to quickly and repeatedly open and close Multiple Logical Channel (MLC) 30 connections with the MFP 18 over the parallel cable 19 (best shown in FIG. 1). Those of ordinary skill in the art will recognize that the MLC 30 is a parallel port protocol that splits a single parallel connection into several "logical channels" which can then be used for command data, scan data, print data, etc., and that the required functionality can be realized using other multiplexing transport protocols besides MLC.

The above described tests can be performed at different maximum segment sizes (MSS), i.e., the maximum number of data bytes per packet used when passing data from the MFP 18 to the network 10. In this manner, the performance (and reactions) of the server 14 can be measured under various external network conditions without actually having to produce those conditions in the network 10.

Figure 4A:
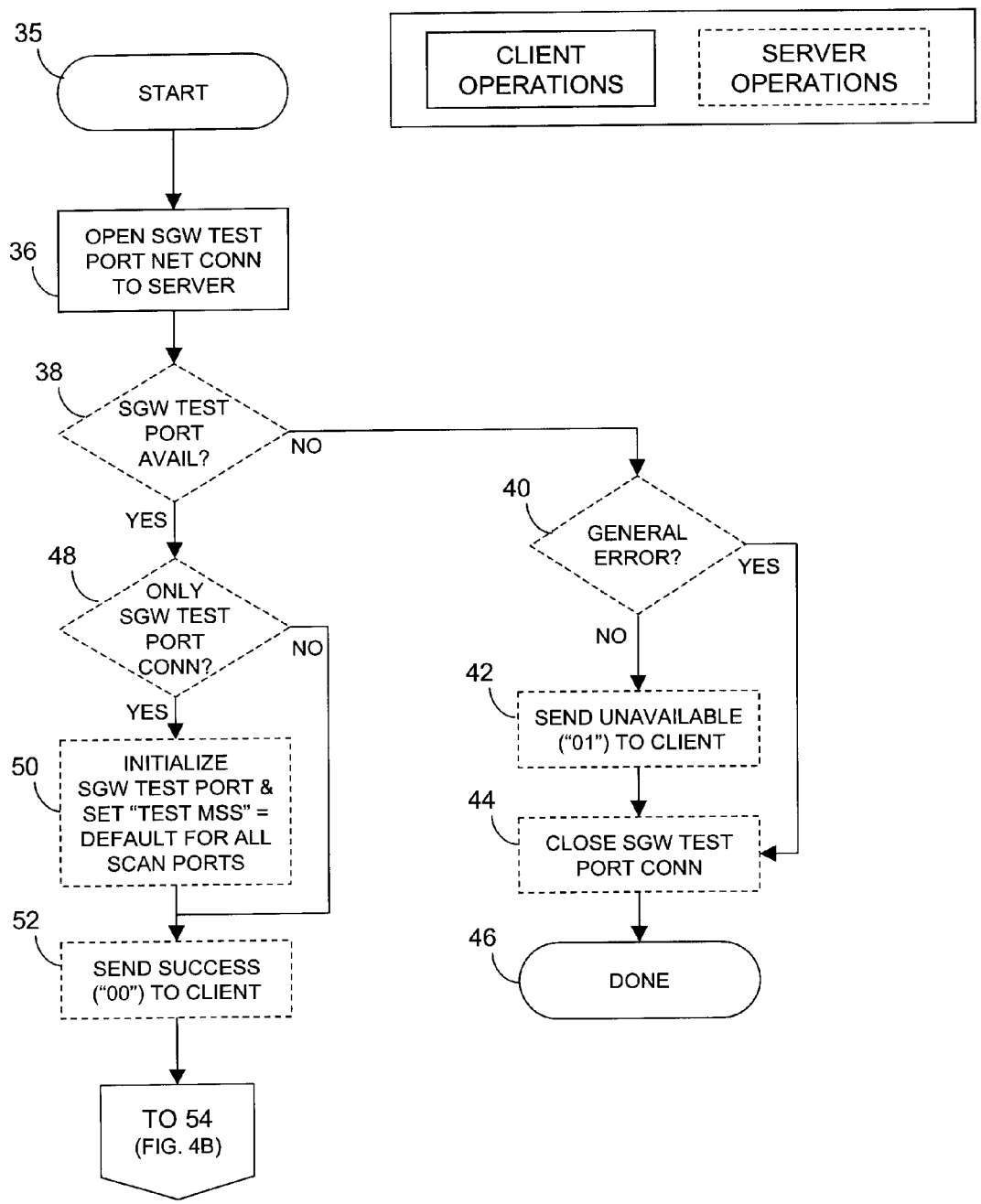
FIG. 4A and FIG. 4B are flowcharts describing the steps involved in establishing a connection to one of the server test ports and issuing test port commands in accordance with an embodiment of the invention.

To initiate any of the above-described tests, the TCP/SPX interface 22 provides a SGW test port 32 (best shown in FIG. 3) which supports one or more network connections. Turning to FIG. 4A, communication with a SGW test port 32 is started (Block 35) when a client 12 sends a signal to the peripheral server 14 through a temporary connection in the SGW test port, requesting it to accept a connection (Block 36) on the SGW test port 32 for the purposes of sending commands and receiving status reports. Upon receiving the connection request, the peripheral server 14 checks to see if a connection is available (Block 38). If a connection is not available, the server sends a response back to the client 12, indicating that the test port 32 is unavailable (Block 42) and closes the connection through which the connection request had been made (Block 44). If an error prevents the server from sending a connection response (Block 40), the server simply closes the temporary test port connection (Block 44) without sending a response to the client. In both cases, communication over the test port connection is terminated (Block 46). If, however, the server 14 determines that the SGW test port 32 is available (Block 38), the server performs test port initialization (Block 50) if this is the first open SGW test port connection (Block 48), sends a successful connection response (Block 52) back to the client, and the previously temporary connection becomes a successful test port connection. In the preferred embodiment, the responses sent by the server (Block 42 and Block 52) are comprised of two ASCII digits sent on the newly opened connection and indicate the following, for example:

| Response | Description |
| --- | --- |
| "00" | Successful connection. |
| "01" | Too many test port connections. |
| No Response | General Error. |

The test port connection is disconnected after "01" response is issued by the server 14 or when there is a general error (Block 44).

Figure 4B:
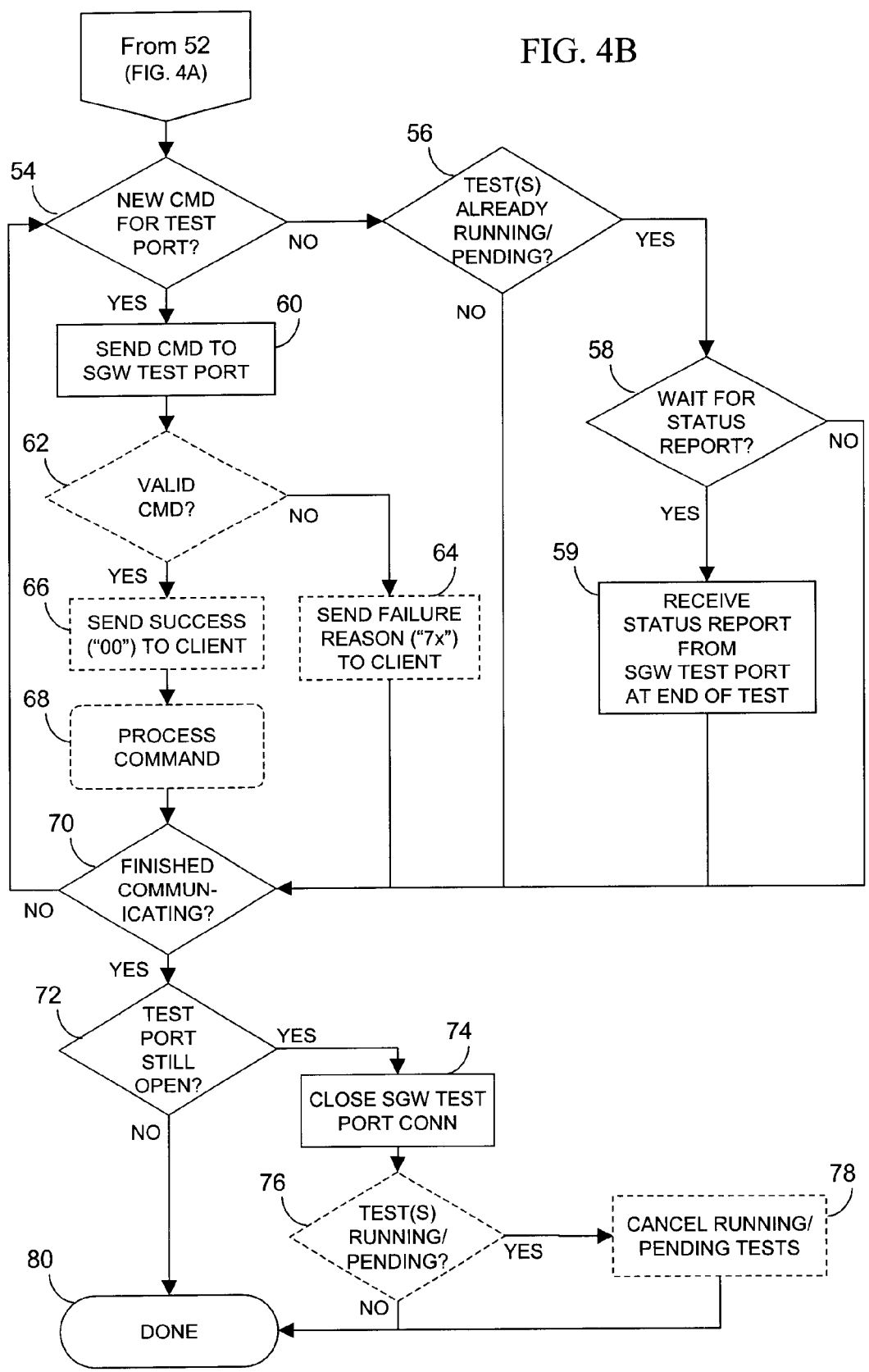

After a successful connection has been made to the SGW test port 32, commands issued by the client 12 and responses generated by the server 14 are transmitted via this connection. Turning now to FIG. 4B, when the client 12 sends a command to the SGW test port 32 (Blocks 54 and 60), the server 14 determines whether or not the command is valid (Block 62) and sends a response to the client 12 indicating either that the command has been accepted (Block 66) or specifying why the command is being rejected (Block 64). Preferably, the command responses are comprised of two ASCII digits, which indicate the following responses, for example:

| Response | Description |
| --- | --- |
| "00" | Command Accepted. |
| "71" | Command Rejected: Unknown Command. |
| "72" | Command Rejected: Another command is already Pending/Running |
| "73" | Command Rejected: Requested command cannot be started in the current state. |
| "74" | Command Rejected: Command syntax error. |
| "75" | Command Rejected: Bad port number. |
| "79" | Command Rejected: General Error. |

Figure 9:
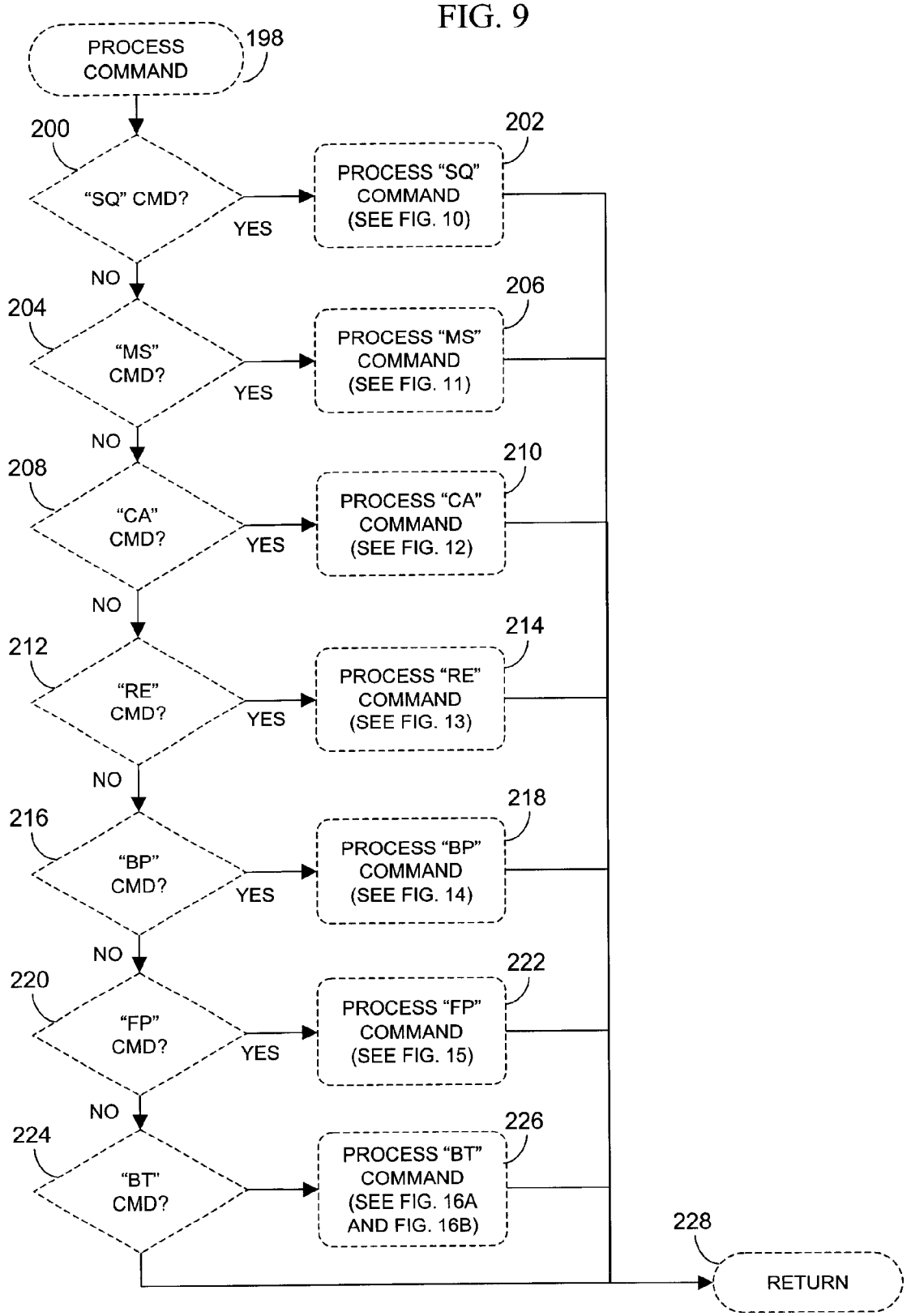
FIG. 9 is a flowchart describing the steps involved in processing test port commands in accordance with an embodiment of the invention.

After notifying the client 12 that a valid command has been accepted (Block 66), the server 14 begins processing the command (Block 68 and FIG. 9). Some commands cause the server 14 to generate one or more status reports when processing completes, but the client 12 is not required to wait for the server 14 to finish processing before issuing more SGW test port commands. After receiving either a successful (Block 66) or negative (Block 64) response to a command, the client can continue communicating (Block 70) by issuing new SGW test port commands (Block 54) or waiting for (Block 58) and receiving status reports (Block 59) from the server 14 for one or more earlier commands (Block 56). The client 12 terminates communication (Block 70) by closing the SGW test port connection (Block 74). This may not be necessary (Block 72) if the connection has already been closed, such as in the case of a Reset command (FIG. 13) being received on another open SGW test port connection. If any SGW test port commands that were initiated by the client 12 are still running or pending (Block 76) at the time the SGW test port 32 is closed, the server 14 cancels the running/pending commands (Block 78). At this point, the SGW test port connection no longer exists (Block 80).

Figure 5:
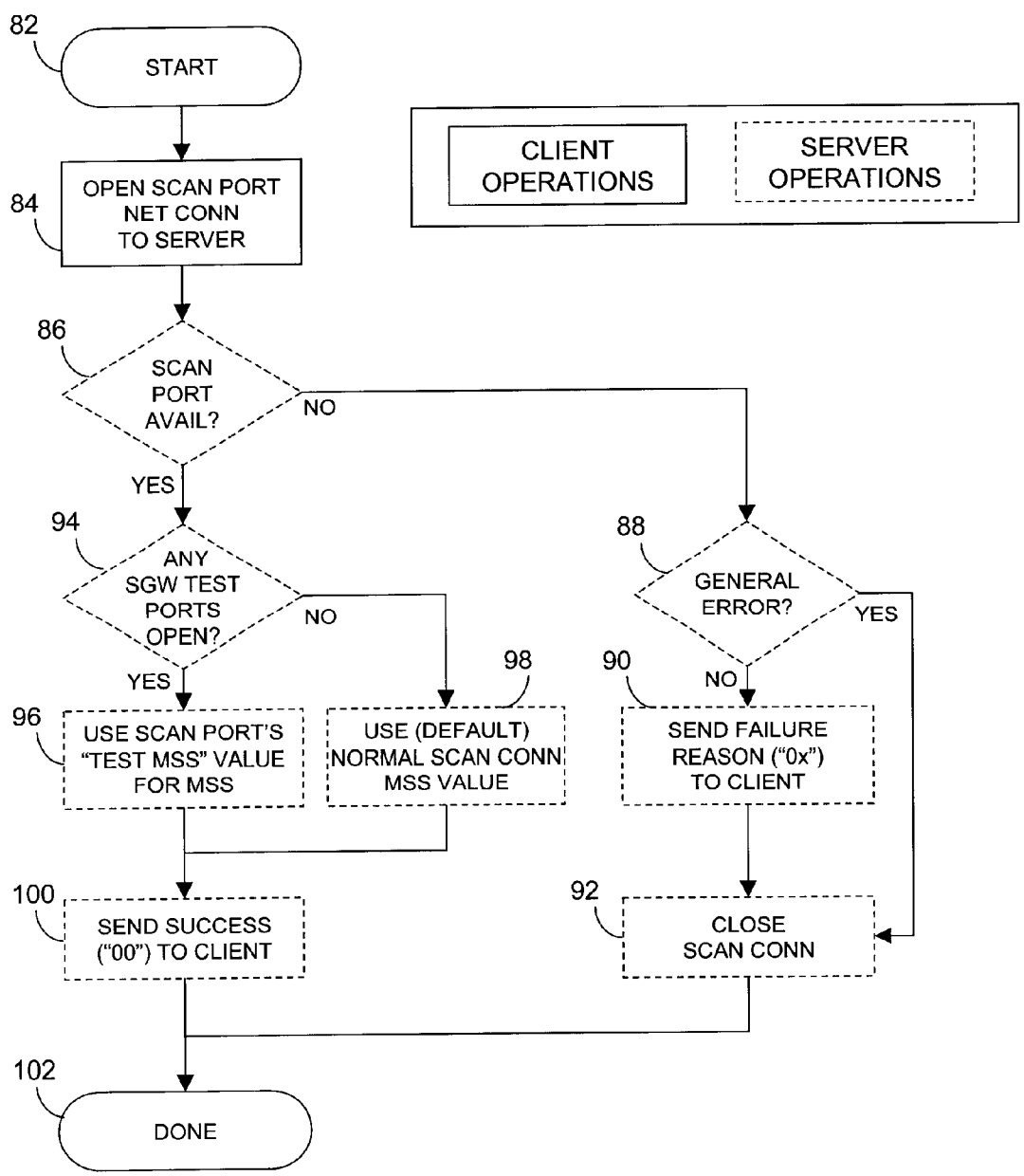
FIG. 5 is a flowchart describing the steps involved in establishing a network scan connection to a scan gateway in accordance with an embodiment of the invention.

Before the performance of a data path of a peripheral server 14 can be measured, the data path must first be established. In the preferred embodiment, a data path is established between a client 12 and a MFP 18 through a SGW scan gateway 24 (best shown in FIG. 3) on the peripheral server 14, preferably using a variation of a method described in commonly assigned U.S. patent application Ser. No. 09/163,496 filed Sep. 30, 1998 and entitled "Network Scanner Contention Handling Method," for example, which is incorporated by reference herein. FIG. 5 describes the steps involved in establishing a data path in accordance with an embodiment of the invention. At the start (Block 82), the client 12 sends a signal over the network 10 to a selected one of the SGW scan ports 31, requesting it to accept a network scan connection (Block 84). If the SGW scan port 31 is busy or unavailable (Block 86), the server 14 sends a response back to the client 12 indicating same (Block 90) and closes the connection between the selected SGW scan port 31 and the network 10 (Block 92). If an error prevents the server 14 from sending a connection response (Block 88), the server simply closes the SGW scan port connection (Block 92) without sending a response to the client. In both cases, the initial connection between the SGW scan port 31 and the network 10 is terminated (Block 92). If, however, the server 14 determines that the SGW scan port 31 is available (Block 86), the server sets the maximum segment size (MSS) for the SGW scan port to either the "Test MSS" value if a SGW test port connection is already open (Block 94 and Block 96), or uses the default MSS value that was received from the network 10 if there are no other open, SGW test port connections (Block 98). After setting the MSS value, the server 14 sends a successful connection response (Block 100) back to the client 12, and the connection between the selected SGW scan port 31 and the network 10 remains open for communication, completing establishment of the data path (Block 102). In the preferred embodiment, the responses sent by the server 14 (Block 90 and Block 100) are comprised of two ASCII digits sent on the newly opened SGW scan port connection and indicate the following, for example:

| Response | Description |
| --- | --- |
| "00" | Successful connection. |
| "01" | Scanner Busy. |
| "02" | Scanner Unavailable. |
| No Response | General Error. |

Figure 6:
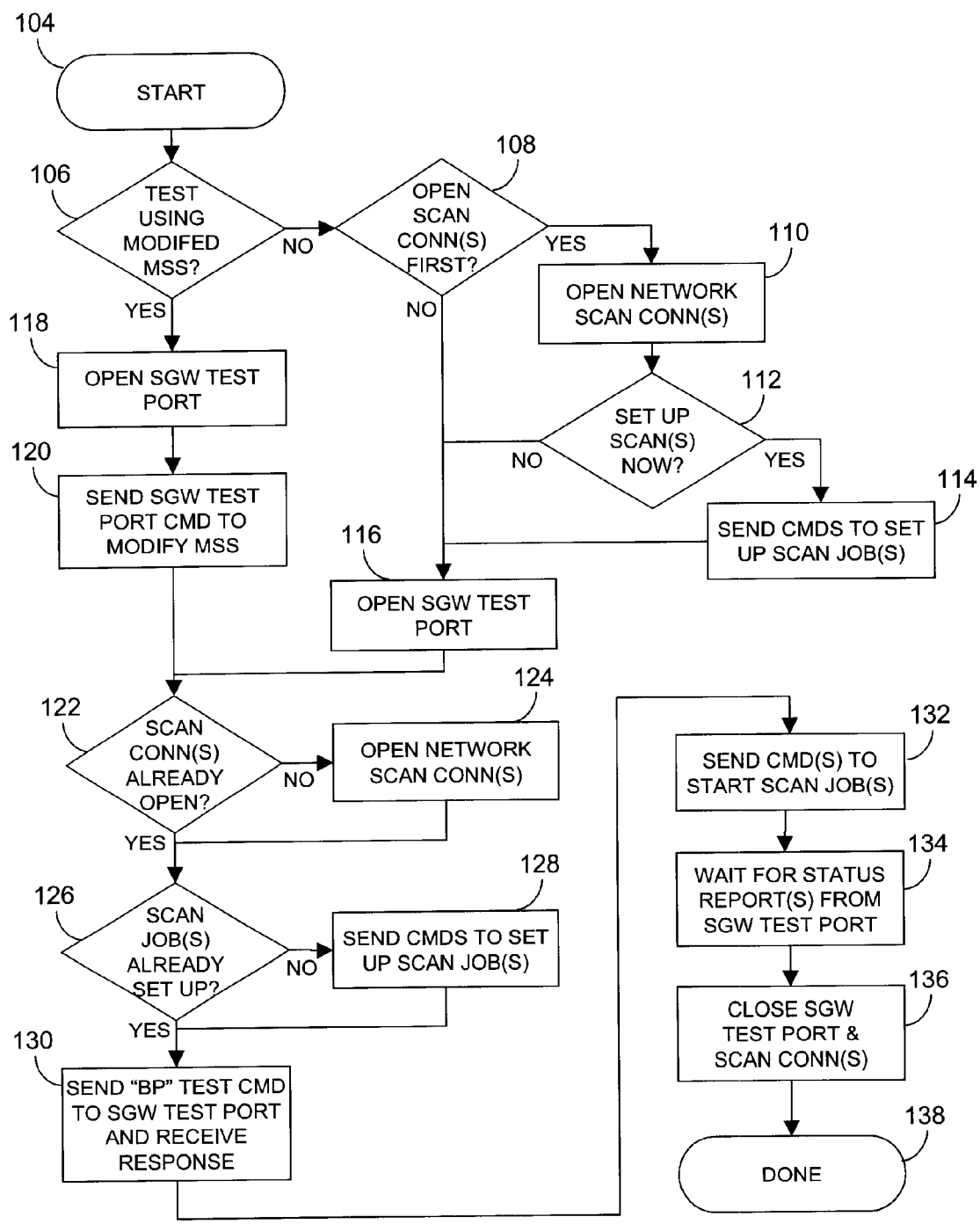
FIG. 6 is a flowchart describing the steps involved in performing a Backplane Performance test in accordance with an embodiment of the invention.

Turning now to FIG. 6, the method for conducting the Backplane Performance (BP) test in accordance with the invention is described. Prior to issuing a Backplane Performance (BP) test command (Block 130), the client 12 must open one or more SGW scan port 31 connections (Block 110 and Block 124; and FIG. 5) and a SGW test port 32 connection (Block 116 and Block 118; and FIG. 4A) to the TCP/SPX interface 22 on the server 14. In accordance with an embodiment of the invention, the MSS can only be set at connection establishment time. Accordingly, if a modified MSS value is to be used during the test (Block 106), then the client must open the SGW test port 32 connection (Block 118) and issue the SGW test port command to modify the scan port MSS value (Block 120) before opening the SGW scan port connection (Block 122 and Block 124); otherwise, the ports 32 can be opened in either order shown in Blocks 108, 110, 116, 122 and 124.

After the SGW scan port connection(s) have been established, the client 12 sends any commands necessary to set up scan jobs on the specified SGW scan port connections (Blocks 112, 114, 126 and 128). The setup commands are sent before sending the BP test command because the BP test starts running as soon as data is received from the backplane BIO interface 20. If the test were started before setting up the scan jobs, responses to the setup commands could incorrectly cause the test to start running, resulting in inaccurate throughput measurements. After the client 12 has established the required connections and set up the scan jobs, the client 12 sends a BP command to the server 14 on the SGW test port connection 32 and waits for a response (Block 130), as described earlier in FIG. 4B. In the preferred embodiment, the BP command can include parameters to specify the peripheral port(s) and number of bytes to be received during the test. After receiving a successful response to the BP command, the client 12 sends the necessary commands to start a scan job on each of the specified SGW scan port connections (Block 132). As the test completes on each of the specified SGW scan port connections, the server 14 generates a status report providing results of the BP test. After receiving the status reports (Block 134), the client 12 sends a signal to the server 14 to close the SGW test port 32 and SGW scan port 31 connections on the TCP/SPX interface 22 (Block 136). The BP test is ended at this point (Block 138).

Figure 7:
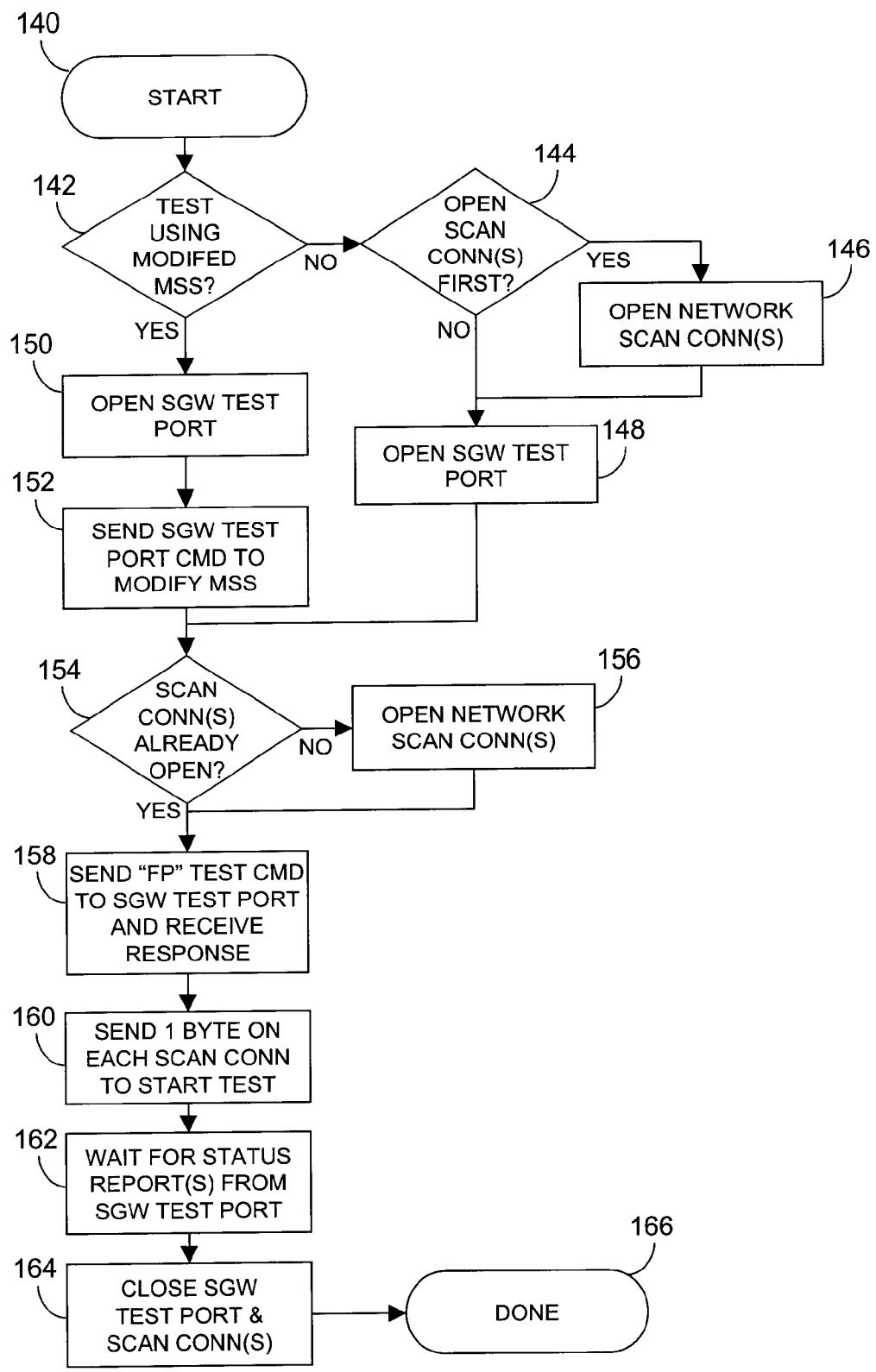
FIG. 7 is a flowchart describing the steps involved in performing a Frontplane Performance test in accordance with an embodiment of the invention.

Turning now to FIG. 7, the Frontplane Performance (FP) test according to the invention is described. Prior to issuing a Frontplane Performance (FP) test command (Block 158), the client 12 must open one or more SGW scan port 31 connections (Block 146 and Block 158; and FIG. 5) and a SGW test port 32 connection (Block 148 and Block 150; and FIG. 4A) to the TCP/SPX interface 22 on the server 14. In accordance with an embodiment of the invention, the MSS can only be set at connection establishment time. Accordingly, if a modified MSS value is to be used during the test (Block 142), then the client must open the SGW test port 32 connection (Block 150) and issue the SGW test port command to modify the scan port MSS value (Block 152) before opening the SGW scan port connection (Block 154 and Block 156); otherwise, the ports can be opened in either order shown in Blocks 144, 146, 148, 154 and 156.

After the client 12 has established the required connections, the client 12 sends a FP command to the server 14 on the SGW test port connection 32 and waits for a response (Block 158), as described earlier with reference to FIG. 4B. In the preferred embodiment, the FP command can include parameters to specify peripheral (MFP) port(s) and the number of test bytes to be generated and sent by the server 14 to the network 10 on each SGW scan port connection during the test. After receiving a successful response to the FP command, the client 12 sends at least one byte of data to the server 14 on each of the specified TCP/SPX interface 22 SGW scan port 31 connections (Block 160), to signal the server 14 to start sending test data to the network 10 on the connection. As the test completes on each of the specified SGW scan ports (Block 162), the server 14 generates a status report providing results of the FP test. After receiving the status reports (Block 162), the client 12 sends a signal to the server 14 to close the SGW test port 32 and the SGW scan port 31 connections on the TCP/SPX interface 22 (Block 164). The FP test is ended at this point (Block 166).

Figure 8:
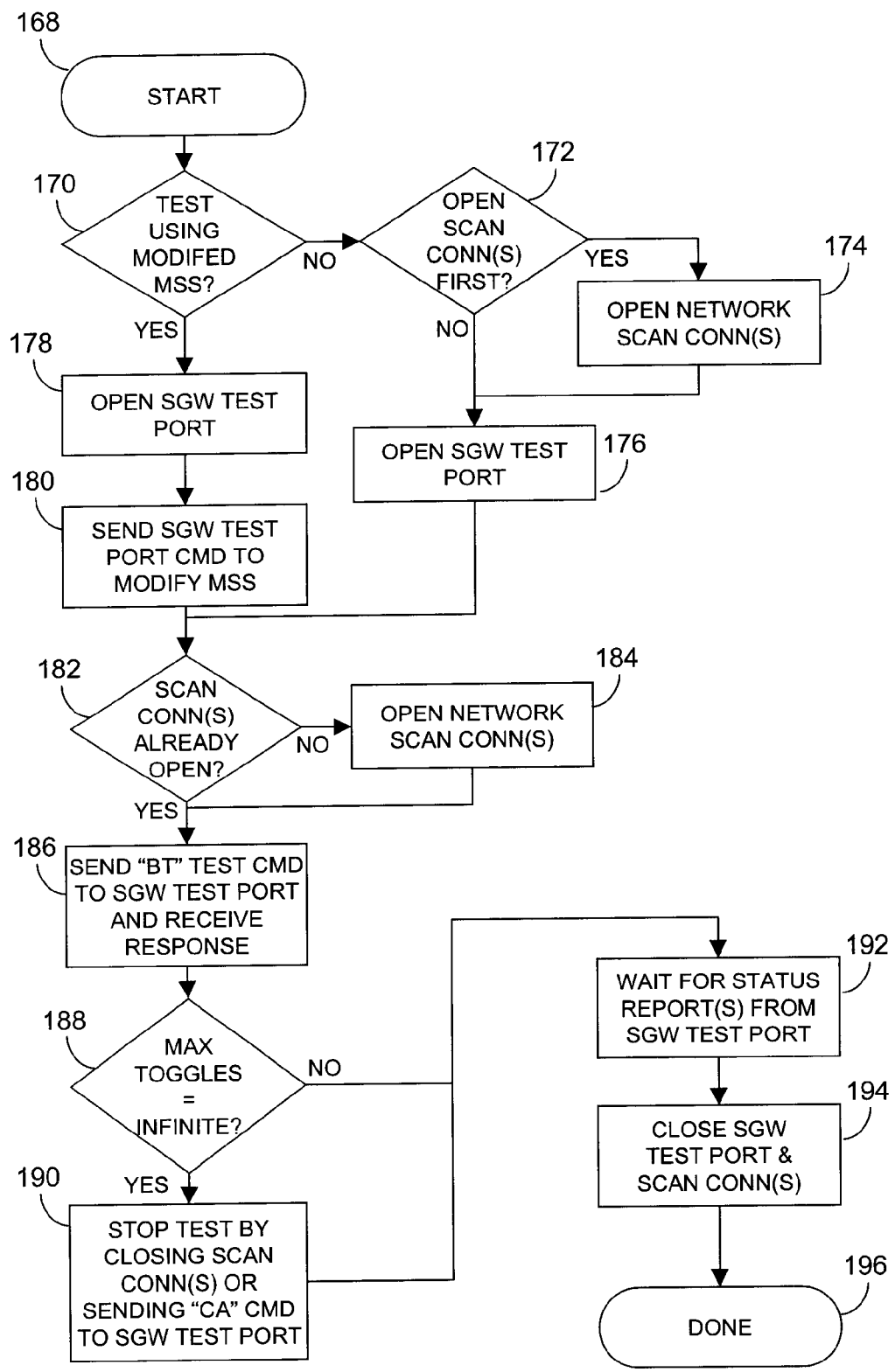
FIG. 8 is a flowchart describing the steps involved in performing a Backplane Toggle test in accordance with an embodiment of the invention.

FIG. 8 describes a Backplane Toggle (BT) test in accordance with the invention. As stated previously, the BT test measures the ability of the peripheral server 14 to quickly and repeatedly open and close the Multiple Logical Channel (MLC) 30 connections with the MFP 18 over the parallel cable 19 (best shown in FIGS. 2 and 3). As in the BP and the FP tests, prior to issuing a BT test command (Block 186), the client 12 must open one or more SGW scan port 31 connections (Block 174 and Block 184; and FIG. 5) and a SGW test port 32 connection (Block 176 and Block 178; and FIG. 4A) to the TCP/SPX interface 22 on the server 14. If a modified MSS value is to be used during the test (Block 170), then the client must open the SGW test port 32 connection (Block 178) and issue the SGW test port command to modify the scan port MSS value (Block 180) before opening the SGW scan port connections (Block 182 and Block 184); otherwise, the ports can be opened in either order shown in Blocks 172, 174, 176, 182 and 184.

After the client 12 has established the required connections, the client 12 sends a BT command to the server 14 on the SGW test port connection 32 and waits for a response (Block 186), as described earlier in FIG. 4B. In the preferred embodiment, the BT command can include parameters to specify the peripheral port(s), the number of times to open (toggle) the MLC connection 30 on each port, and the delay, if any, after an open failure on an MLC connection 30. After sending a positive response to the BT command (Block 186), the server 14 begins toggling, i.e., opening and closing, the MLC connection 30 between the BIO interface 20 and the MFP 18 on each specified port.

If the BT command specifies an infinite number of opens (toggles) for the MLC connections 30 (Block 188), the client must terminate the BT test by sending a Cancel (CA) command on the SGW test port 32 connection, or by closing the SGW test port 32 or SGW scan port 31 connections (Block 190). Otherwise, the server 14 will terminate the BT test on each specified port after the MLC connection 30 has been opened (toggled) the specified number of times. As the test completes on each of the specified SGW scan ports (Block 192), the server 14 generates a status report providing results of the FP test. After receiving the status reports (Block 192), the client 12 sends a signal to the server 14 to close the SGW test port 32 and the SGW scan port 31 connections on the TCP/SPX interface 22 (Block 194). The FP test is ended at this point (Block 196).

In the above-described tests, the server 14 generates a status report for each port being tested and sends it to the client on the SGW test port 32 connection at the conclusion of the test. It should also be noted that status reports will be generated by the server 14 in response to Status Query (SQ), Cancel (CA) and Reset (RE) commands received from the client 12 on a SGW test port 32 connection. Whether generated upon the completion of a test or in response to one of the above commands, the status report provides the client with information concerning the performance or the status of the SGW 24 of the peripheral server 14. In the preferred embodiment, the status report contains the following fields, where the "x" characters shown in the field column are replaced by values in the actual status reports:

| Field | Description |
| --- | --- |
| SR | 2-byte identifier indicating start of status report. |
| P=x | Peripheral (MFP) port number (0–2) associated with this status report. |
| MSSC=xxx | Most recent value received in a test port MS command for this peripheral port. |
| ID=xx | 2-byte test identifier (BP, FP, BT, or <null>) associated with current or most recent test. |
| ST=xx | Status of current or most recent test:<br>"00" - Test Completed or Idle<br>"01" - Test Pending<br>"02" - Test Running |
| RES=xx | Result of current or most recent test:<br>"00" - Success<br>"01" - Failure due to Network Disconnect<br>"02" - Failure due to Scanner Reset<br>"03" - Test Canceled<br>"04" - Failure due to Idle Timeout<br>"05" - Failure due to SGW Test Port disconnect |

-continued

| Field | Description |
|---|---|
| | "06" - Failure due to error while sending data to network |
| | "FF" - Failure due to General Error |
| MSS=xxx | Max segment size used during the current or most recent test. |
| BUF=xx | Number of buffers currently outstanding (applies to FP test only). |
| BUFPS=xx | Max number of buffers that can be sent in a single thread of execution (applies to FP test only). |
| TAR=xxx | Target value: For FP or BP test, target (maximum) byte count. For BT test, target (maximum) number of peripheral open requests. |
| CUR=xxx | Current value: For FP or BP test, current byte count. For BT test, number of positive acknowledgments received for peripheral open requests. |
| PCT=xx | Percent completion of current or most recent test. |
| V1=xxx | Test-specific value 1: For FP test, MSS value received from network on scan connection. For BT test, number of negative acknowledgments received for peripheral open requests. Does not apply to the other tests. |
| V2=xx | Test specific value 2: For FP test, number of times max buffers not available when attempting to send data. For BT test, value of time duration (clock ticks) parameter BT command. Does not apply to the other tests. |
| T=xxxx | Elapsed time (in system clock ticks) for current or most recent test. |
| R=xxxx | Rate: For FP or BP test, estimated data rate in bytes/sec. For BT test, number of peripheral open requests/sec. |

It is contemplated that additional fields may be added to, or one or more fields deleted from the above preferred status report so that the status report can be adapted to the particular use of the operator.

Turning again to FIG. 4B, the processing of SGW test port commands is performed by a firmware 25 provided within the SGW 24 of the server 14 (Block 68). After receiving a valid SGW test port command (Block 62), the server 14 sends a success response to the client (Block 66) and then processes the command (FIG. 4B, Block 68; and FIG. 9, Block 198). Turning now to FIG. 9, the server 14 first identifies the individual command to be processed. Valid SGW test port commands include Status Query (SQ) (Block 200), Max Segment Size (MS) (Block 204), Cancel (CA) (Block 208), Reset (RE) (Block 212), Backplane Performance (BP) (Block 216), Frontplane Performance (FP) (Block 220) and Backplane Toggle (BT) (Block 224) commands. The details for processing each of the above commands are described in FIG. 10 to FIG. 16B. In the preferred embodiment of the invention, the server 14 is available to accept new commands from clients (FIG. 4B; and Block 228 of FIG. 9) while other commands are being processed (Blocks 202, 206, 210, 214, 218, 222 and 226).

Figure 10:
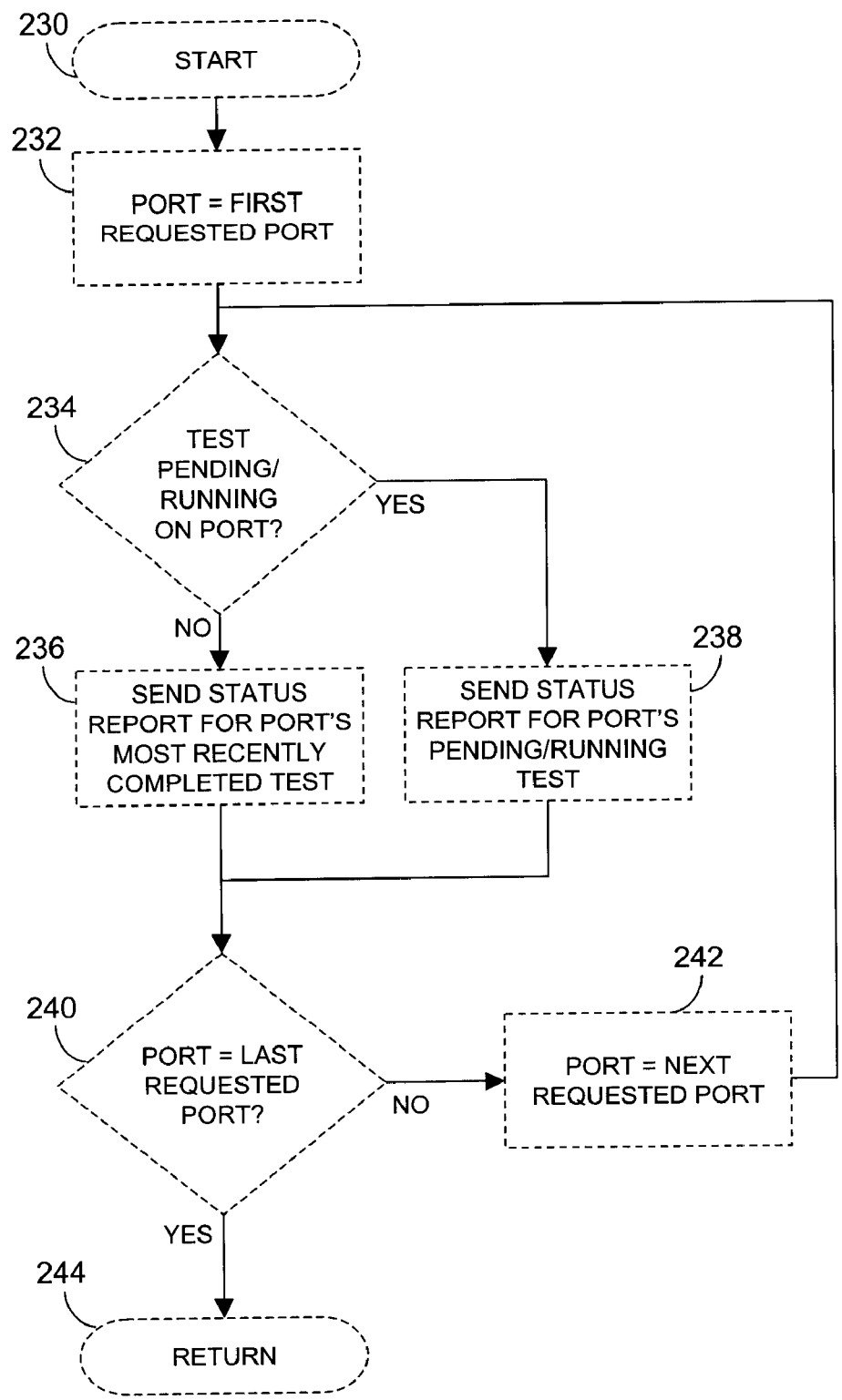
FIG. 10 is a flowchart describing the steps involved in processing a Status Query command in accordance with an embodiment of the invention.

Turning to FIG. 10, the method of processing the Status Query (SQ) command according to the preferred embodiment of the invention is described. The SQ command causes the server 14 to send a status report for each port specified by the command. At the start of the SQ command processing (Block 230), the server 14 collects status for the first requested port 31 (Block 232). If a test is currently pending or running on the requested port 31 (Block 234), the server generates and sends a status report of the currently pending/running test (Block 238); otherwise, the server 14 generates and sends a status report of the requested port's most recently completed test (Block 236) or an empty report if no tests have been run. The status report format is the same as described earlier, and the report is sent to the client that issued the SQ command, on the same SGW test port 32 connection. If additional ports 31 were specified by the SQ command (Block 240), the above steps are repeated for each additional port (Block 242), until a status report has been sent for all of the requested ports. After a status report for the last requested port 31 has been sent (Block 240), the SQ command processing is completed (Block 244).

Figure 11:
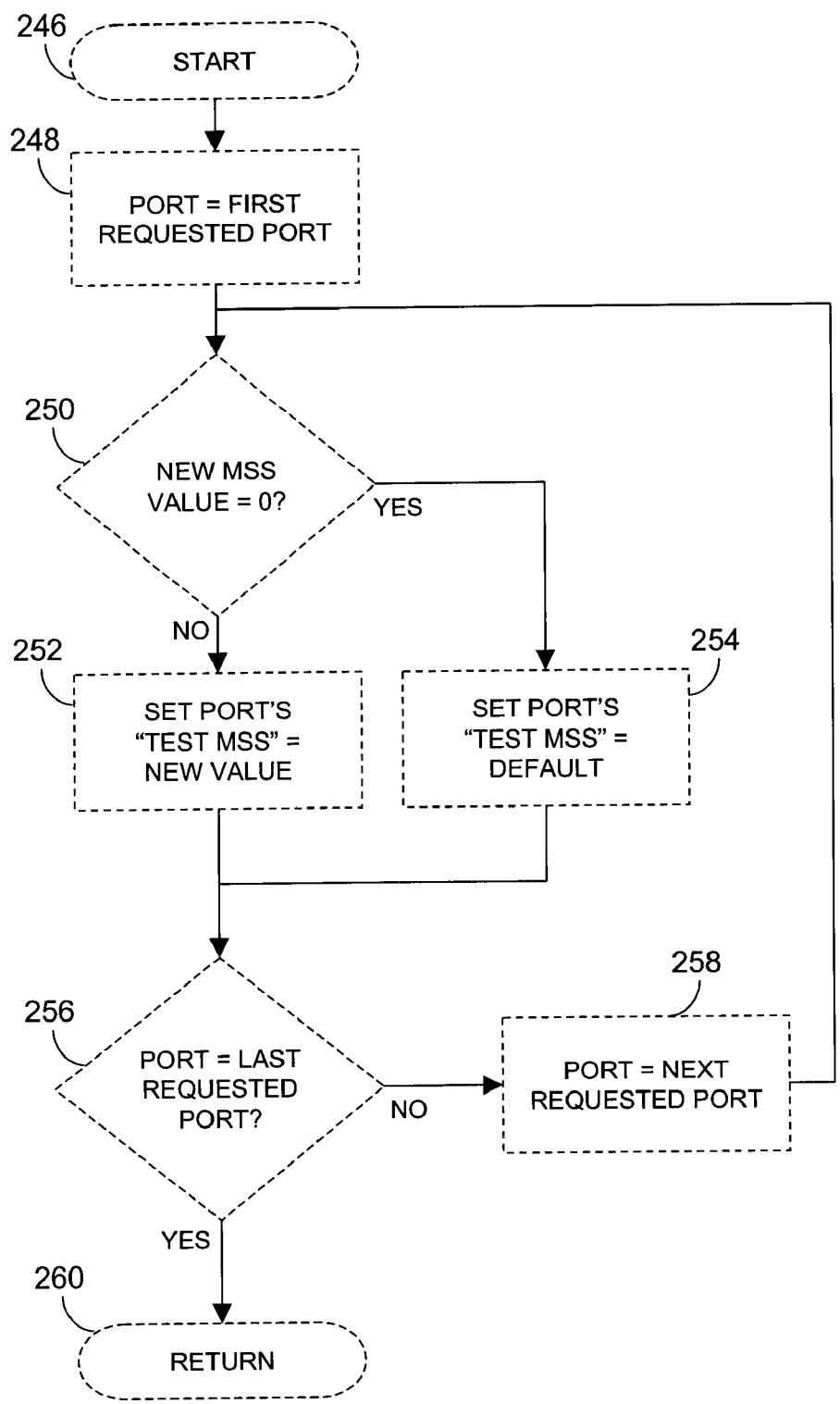
FIG. 11 is a flowchart describing the steps involved in processing a command to modify the maximum segment size in accordance with an embodiment of the invention.

Turning now to FIG. 11, the method of processing the Max Segment Size (MS) command according to the preferred embodiment of the invention is described. In accordance with an important aspect of the invention, the maximum segment size of the data packets can be modified independently of the external network conditions, so that the performance of the server 14 can be measured under different conditions. The MS command causes the server 14 to change the MSS value on the specified ports 31. The MSS value is the maximum size of packets sent by the TCP/SPX interface 22 to the network 10 on SGW scan port connections, and also the maximum allowable size of packets received by the BIO interface 20 from peripherals on the MLC connections 30. In the preferred embodiment of the invention, the value specified in the MS command is stored as a Test MSS value that does not affect currently open MLC and SGW scan port connections 30, 31 but is applied to all subsequently opened connections on the specified ports. At the start of the MS command processing (Block 246), the server 14 changes the Test MSS value on the first requested port 31 (Block 248). If the MSS value specified by the MS command is zero (Block 250), the default MSS calculation will be performed for each subsequent connection on the port 31 (Block 254); otherwise, the new Test MSS value will be used as the MSS value for all subsequent connections on the port (Block 252). If additional ports 31 were specified by the MS command (Block 256), the above steps are repeated for each additional port (Block 258), until the Test MSS value has been set for all of the requested ports. After a value has been set for the last requested port 31(Block 256), the MS command processing is completed (Block 260). The new Test MSS value preferably remains in effect until the connection to the SGW test port 32 is closed or the Test MSS value is again modified as described above.

Figure 12:
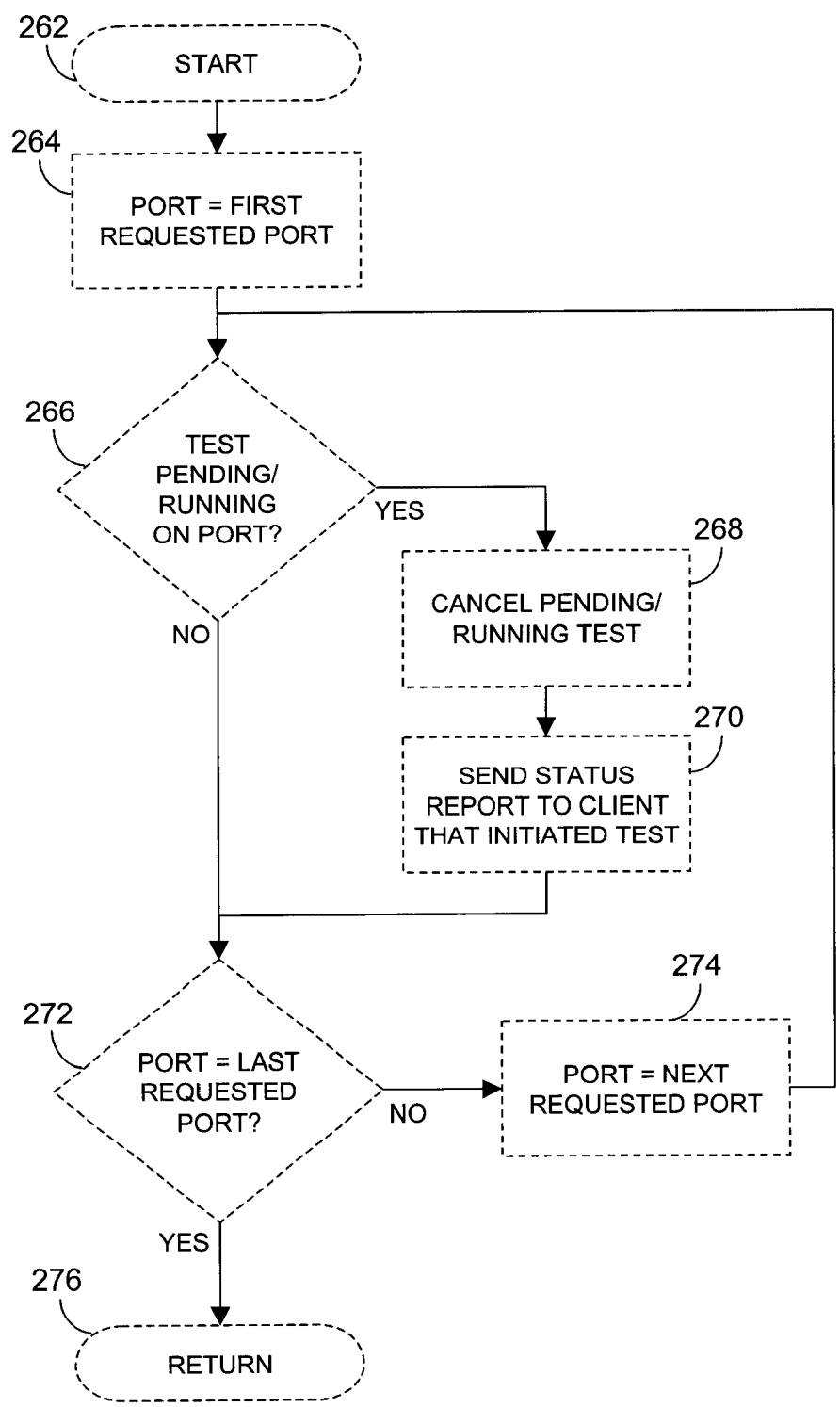
FIG. 12 is a flowchart describing the steps involved in processing a Cancel command in accordance with an embodiment of the invention.

Turning to FIG. 12, the method of processing the Cancel (CA) command according to the preferred embodiment of the invention is described. The CA command causes the server 14 to cancel any tests currently pending or running on ports 31 specified by the command. The server starts the CA command processing (Block 262) with the first requested port 31 (Block 264). If a test is currently pending or running on the requested port 31 (Block 266), the server cancels the test (Block 268) and sends a status report to the client that initiated the test (Block 270), indicating that the test was cancelled. If additional ports 31 were specified by the CA command (Block 272), the above steps are repeated for each additional port (Block 274), until all of the requested ports have been processed (Block 272), at which time CA command processing is completed (Block 276).

Figure 13:
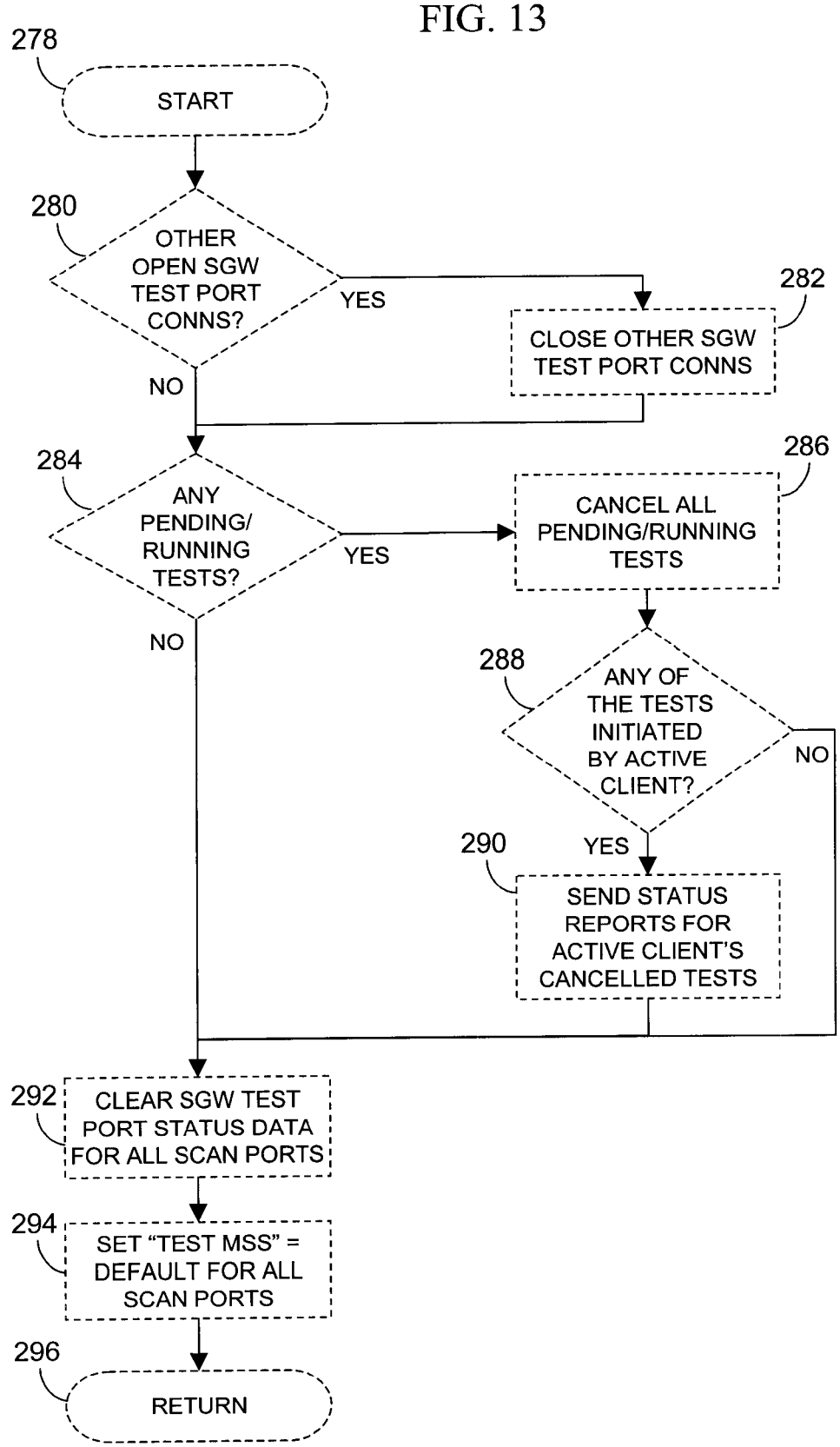
FIG. 13 is a flowchart describing the steps involved in processing a Reset command in accordance with an embodiment of the invention.

Turning to FIG. 13, the method of processing the Reset (RE) command according to the preferred embodiment of the invention is described. The RE command causes the server 14 to close all the SGW test port 32 connections other than the one that received the Reset command, cancel all tests currently pending or running on any ports, reinitialize the status report values on all ports, and clear any Test MSS values that were set by previous MS commands.

The server 14 starts the RE command processing (Block 278) by determining whether any other SGW test port connections are open (Block 280), and if so, closing the other SGW test port connections (Block 282). If tests are pending or running on any ports (Block 284), the server 14 cancels the pending/running tests (Block 286). If the SGW test port 32 connection used to initiate any of the tests that were cancelled still exists (Block 288), the server 14 sends a status report on the SGW test port connection to the client 12 that initiated the test (Block 290), indicating that the test was cancelled. The server 14 then clears the test status information on all ports (Block 292), so that subsequent status reports will indicate that no tests have been run. Finally, the server 14 sets the Test MSS value to default on all ports (Block 294), so that the default MSS calculations will be used on subsequent scan connections, and the RE command processing is completed (Block 296).

Figure 14:
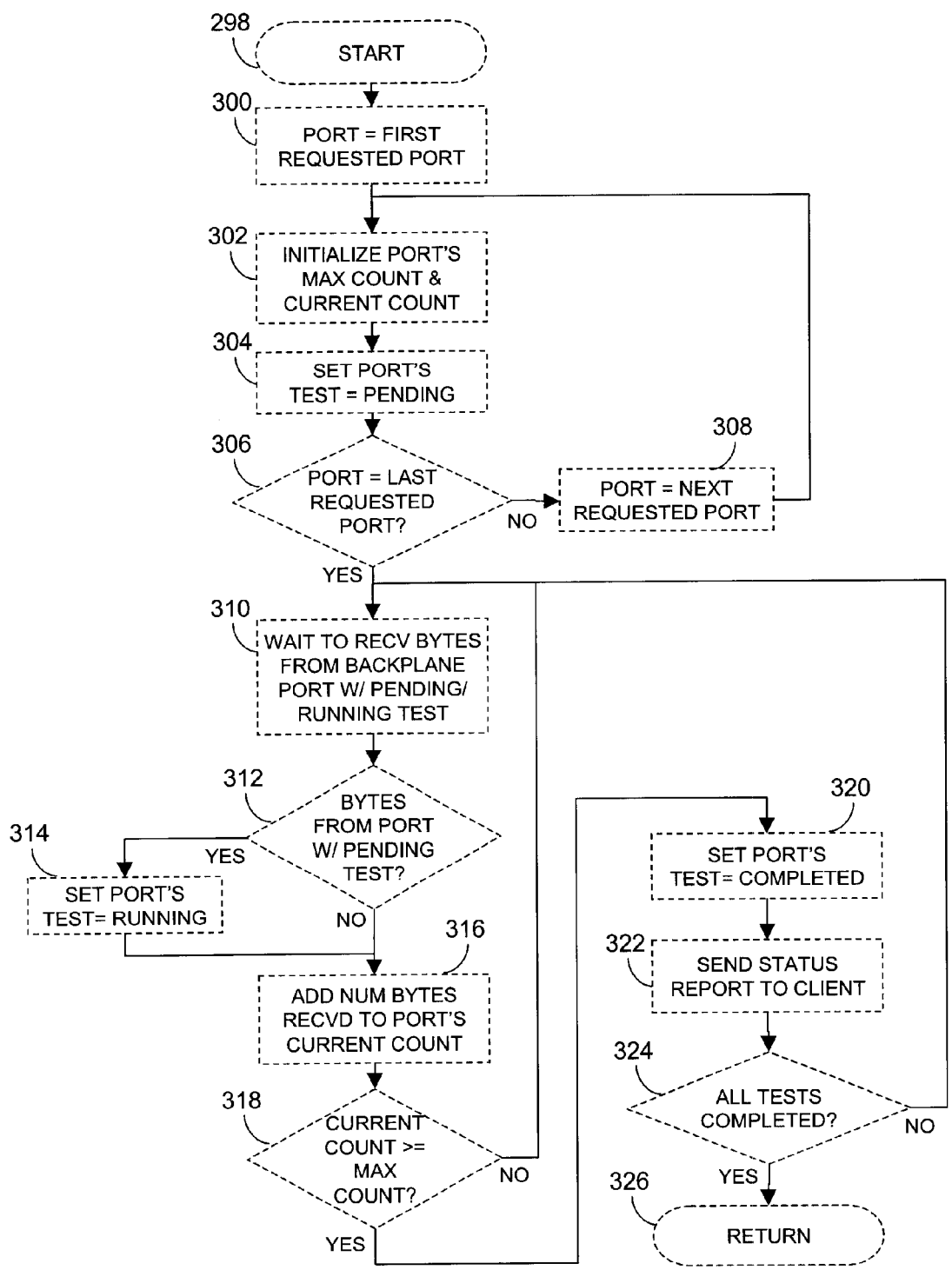
FIG. 14 is a flowchart describing the steps involved in processing a Backplane Performance command in accordance with an embodiment of the invention.

Turning to FIG. 14, the method of processing the Backplane Performance (BP) command according to the preferred embodiment of the invention is described. As stated previously, the BP test measures the amount of time required for the server 14 to receive a specified number of bytes of scan data from the MFP 18 via the BIO interface 20. In this test, the data is discarded once received to eliminate internal processing time. The server 14 starts the BP command processing (Block 298) with the first requested port 31 (Block 300) by setting the port's max count value to the number of bytes specified in the BP command and initializing the port's current byte count to zero (Block 302). The server also initializes the port 31 to the test pending state (Block 304). If additional ports were specified by the BP command (Block 306), the above steps are repeated for each additional port (Block 308), until all of the requested ports have been initialized to the test pending state (Block 306).

Unless the BP command is cancelled, each port 31 remains in the test pending state until the server 14 receives at least one byte of data from the MFP 18 on the port's BIO interface 20 (Block 310). If the port 31 is in pending state at the time data is received on the BIO interface 20 (Block 312), the server 14 sets the port to the running state (Block 314). If the port 31 is in either test pending or test running state at the time data is received on the BIO interface 20, the server 14 adds the number of bytes received to the port's current byte count (Block 316). If the port's 31 current byte count is greater than or equal to the port's max count value (Block 318), the server 14 sets the port to test completed state (Block 320) and sends a status report on the SGW test port 32 connection to the client that initiated the test (Block 322). Among other information, the preferred status report includes the number of bytes received on the BIO interface 20 and the amount of time that elapsed between receiving the first and last byte. If the tests have not completed on all of the specified ports 31 (Block 324), the server 14 continues waiting for data to be received from the MFP 18 on the BIO interface 20 for the specified ports, and when data is received, resumes the above process (starting at Block 312). Otherwise, if the tests have completed on all of the specified ports 31 (Block 324), BP command processing is completed (Block 326).

Figure 15:
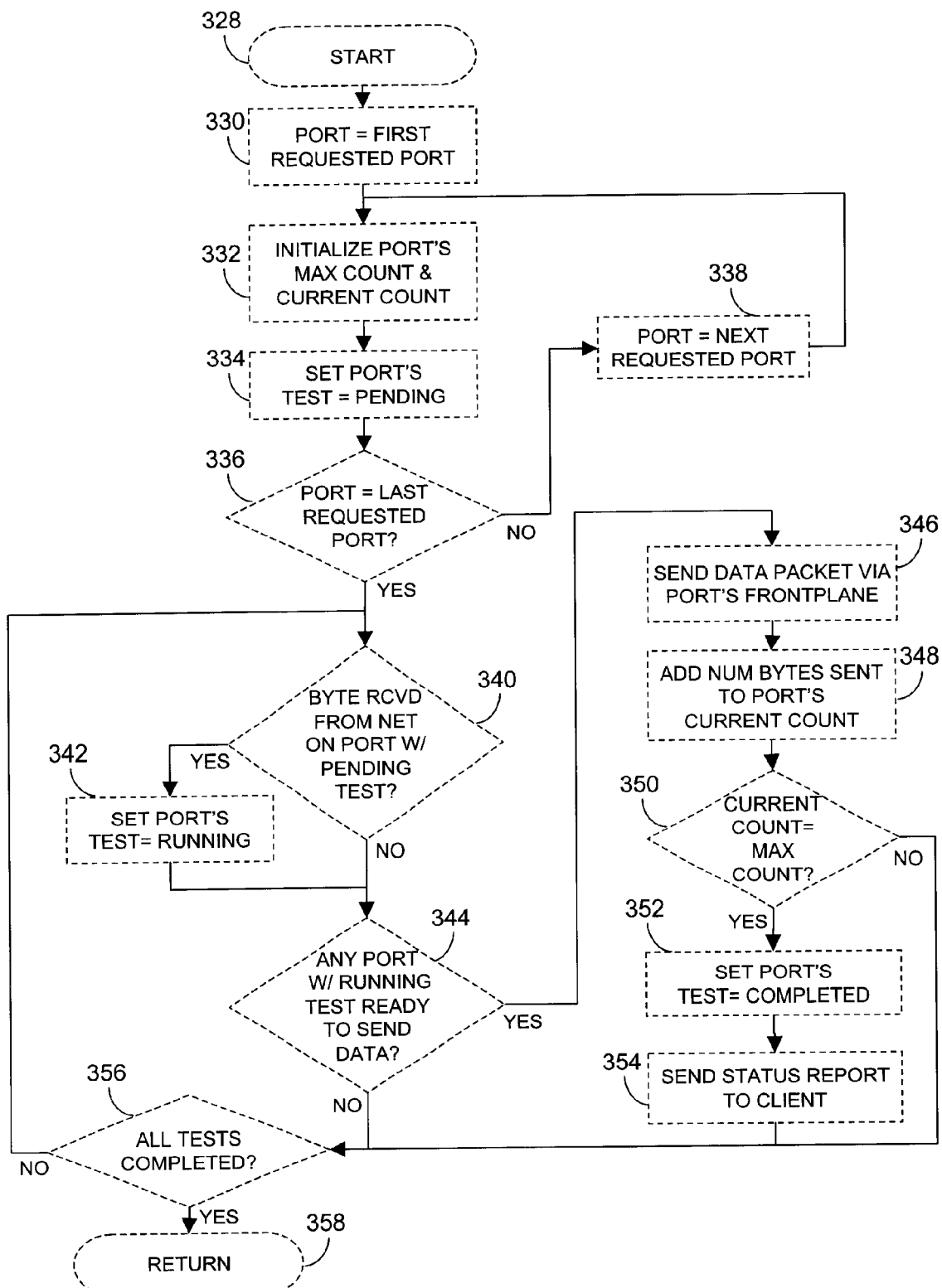
FIG. 15 is a flowchart describing the steps involved in processing a Frontplane Performance command in accordance with an embodiment of the invention.

Turning to FIG. 15, the method of processing a Frontplane Performance (FP) command according to the preferred embodiment of the invention is described. As stated previously, the FP test causes the server 14 to generate a specified number of bytes of test data and send them on the TCP/SPX interface 22 to the network 10. The server 14 starts the FP command processing (Block 328) with the first requested port 31 (Block 330), by setting the port's max count value to the number of bytes specified in the FP command and initializing the port's current byte count to zero (Block 332). The server also initializes the port 31 to the test pending state (Block 334). If additional ports 31 were specified by the FP command (Block 336), the above steps are repeated for each additional port (Block 338), until all of the requested ports have been initialized to the test pending state (Block 336).

Unless the FP command is cancelled, each port 31 remains in the test pending state until the server 14 receives at least one byte of data from the network on the TCP/SPX interface 22 for the pending test's SGW scan port 31 (Block 340). If the port 31 is in pending state at the time data is received on the SGW scan port 31 (Block 342), the server 14 discards the data and sets the port to the running state (Block 344). If any of the SGW scan ports 31 that are in the test running state are ready to send data to the network 10 (Block 344), the server 14 sends a packet on the port's TCP/SPX interface 22 (Block 346) and adds the number of bytes sent to the port's current byte count (Block 348). If the port's current byte count is greater than or equal to the port's max count value (Block 350), the server 14 sets the port to the test completed state (Block 352) and sends a status report on the SGW test port 32 connection to the client that initiated the test (Block 354). It should be noted that in the preferred embodiment of the invention, if the FP command specifies a max byte count of zero, the server 14 treats the max count value as infinite, and thus, continues sending packets until the FP command is canceled.

Among other information, the preferred status report includes the number of bytes sent on the SGW scan port 31 to the network 10 and the amount of time that elapsed between sending the first and last byte. If the tests have not completed on all of the specified ports 31 (Block 356), the server 14 continues waiting for data to be received from the network 10 on one of the ports in the test pending state (Block 340), or a port in the test running state to become ready to send another packet to the network 10 (Block 344). When either of those conditions occur, the server 14 repeats the above steps, starting at Block 340. Otherwise, if the tests have completed on all of the specified ports 31 (Block 356), FP command processing is completed (Block 358).

Figure 16A:
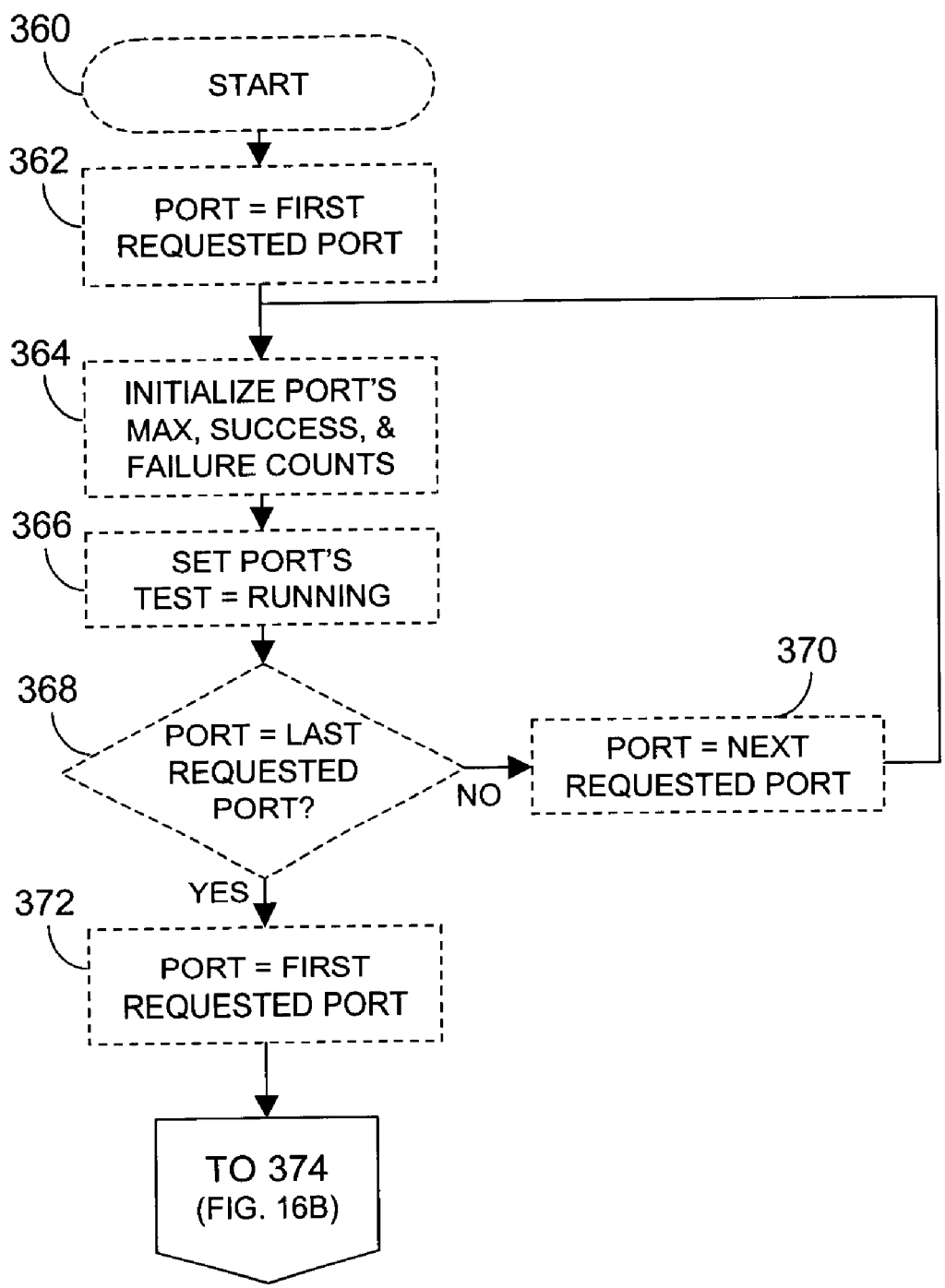
FIG. 16A and FIG. 16B are flowcharts describing the steps involved in processing a Backplane Toggle command in accordance with an embodiment of the invention.

Turning to FIG. 16A, the method of processing a Backplane Toggle (BT) command according to the preferred embodiment of the invention is described. As stated previously, the Backplane Toggle (BT) test measures the ability of the peripheral server 14 to quickly and repeatedly open and close Multiple Logical Channel (MLC) 30 connections with the MFP 18 over the parallel cable 19 (best shown in FIGS. 1 and 3). The server 14 starts the BT command processing (Block 360) with the first requested port (Block 362), by setting the port's max count value to the max open (toggle) count specified in the BT command and initializing the port's current toggle count to zero (Block 364). The server also initializes the port to the test running state (Block 366). If additional ports 31 were specified by the BT command (Block 368), the above steps are repeated for each additional port (Block 370), until all of the requested ports have been initialized to the test running state (Block 368). After completing the above initialization, the server 14 starts the actual toggling of MLC connections 30, beginning with the first requested port (Block 372).

Figure 16B:
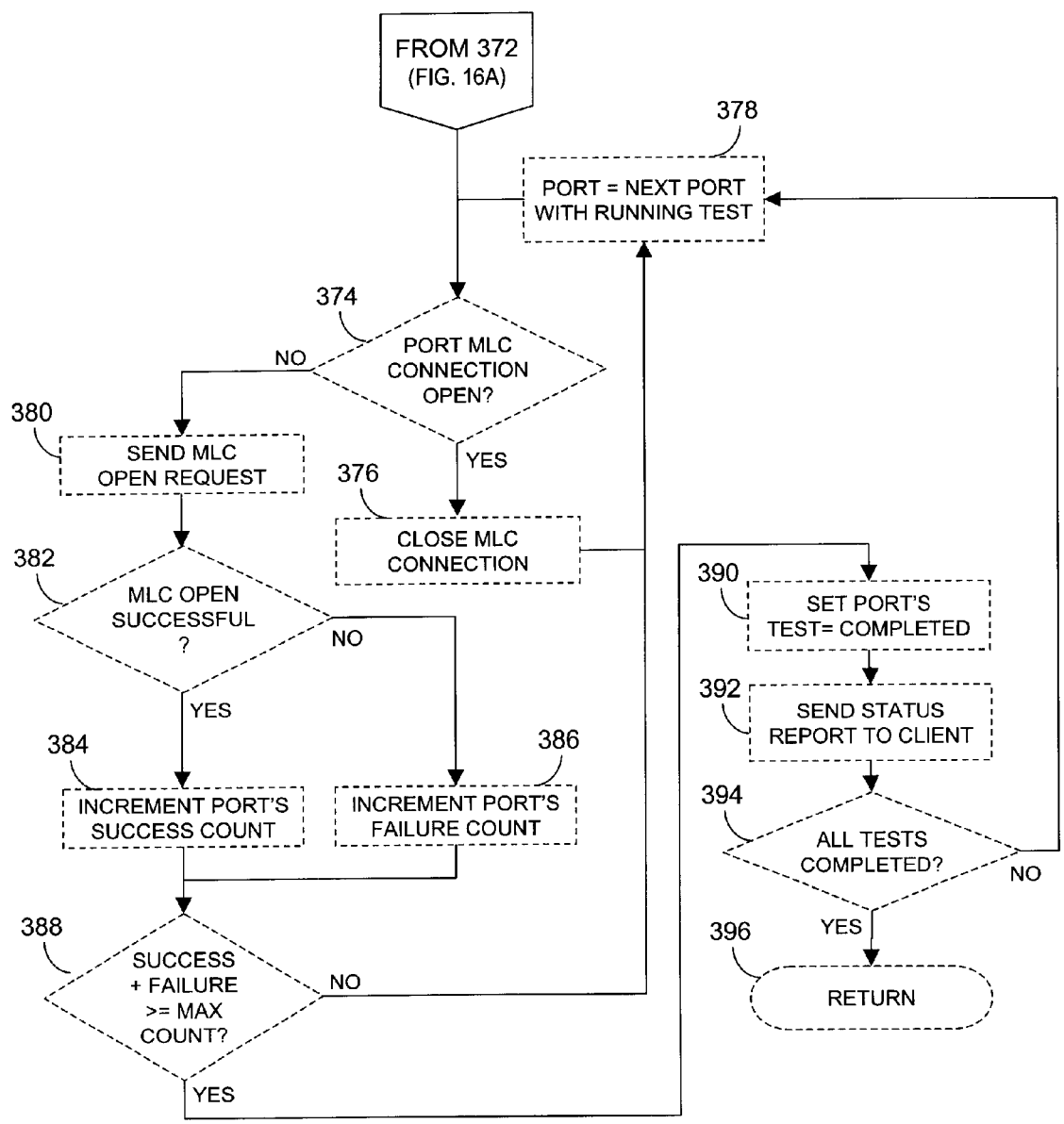

Turning now to FIG. 16B, if the port's MLC connection is already open (Block 374), the server 14 closes the MLC connection (Block 376) and begins processing the next requested port 31 (Block 378), starting again at Block 374; otherwise, the server sends an MLC open request to the MFP 18 (Block 380). If the MLC open request is successful (Block 382), the server increments the port's successful open count (Block 384), otherwise, it increments the port's count of open failures (Block 386). In the case of an open failure, the preferred embodiment of the server 14 will not attempt another open request on the failing port for a specified delay period if the BT command specified a non-zero delay value; other ports 31 will continue to be toggled, however. If the number of open attempts (success count plus failure count) is greater than or equal to the BT command's max toggle value (Block 388), the server 14 sets the port 31 to test completed state (Block 390) and sends a status report on the SGW test port 32 connection to the client that initiated the test (Block 392). It should be noted that in the preferred embodiment of the invention, if the BT command specifies a max toggle count of zero, the server 14 treats the max toggle value as infinite, and thus, continues toggling the MLC connections 30 until the BT command is canceled. Among other information, the preferred status report includes the number of opens that completed successfully and the number of opens that failed, and the amount of time that elapsed between the first and last open attempt. If the tests have not completed on all of the specified ports 31 (Block 394), the server 14 resumes processing with the next port that is in test running state (Block 378), starting again at Block 374. Otherwise, if the tests have completed on all of the specified ports 31 (Block 394), BT command processing is complete (Block 396).

From the foregoing description, it should be understood that an improved method for testing the performance of a data path or gateway of a peripheral server has been shown and described which has many desirable attributes and advantages. It is adapted to test the network interface portion and the peripheral interface portion of the scan gateway of a peripheral server independently and at different maximum segment sizes.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for testing a data path of a server operably connected between at least one peripheral device and at least one client device via a network, the data path being adapted to transmit data between the peripheral device and the network as requested by the client device, said method comprising the steps of:
   independently testing the operating performance characteristics of one of a peripheral interface portion of the data path and a network interface portion of the data path, including testing to determine if the rate at which the server received data were faster than the rate at which it could transmit the data and thereby determine the existence of any bottleneck in a portion of the data path; and
   generating a status report indicating a result of said testing.

2. The method as defined in claim 1 wherein prior to said testing step said method further comprises the steps of:
   opening at least one test connection between the network and the server; and
   establishing at least one data connection between the network and the server.

3. The method as defined in claim 2 wherein said step of opening at least one test connection includes the steps of:
   sending a signal to one of a plurality of connections of a test port provided on the server, requesting that said at least one test connection be opened; and
   opening said at least one test connection through at least one of said plurality of connections of said test port when said one of said plurality of connections of said test port is available, and issuing a response to the network indicating that said test connection could not be opened and disconnecting communication with the network after issuing said response when said at least one of said plurality of connections of said test port is not available.

4. The method as defined in claim 3 wherein the server disconnects communication with the network without issuing said response when an error prevents the server from issuing said response.

5. The method as defined in claim 3 wherein said step of opening at least one test connection further includes the steps of;
   separately determining whether each of at least one command issued by the at least one client device through said opened test connection is valid; and
   processing each said valid command, and generating a response indicating receipt of an invalid command for each invalid command received by the server.

6. The method as defined in claim 2 wherein said step of establishing a data connection includes the steps of:
   sending a signal to a selected one of a plurality of data ports provided on the server, requesting that said data connection be established through said selected data port;
   establishing said data connection when the server determines that said selected data port is available, and issuing a response to the network indicating that said data connection could not be opened and closing communication with the network when the server determines that said selected data port is not available; and
   setting a maximum segment size of data to be sent through said established data connection after establishing said data connection.

7. The method as defined in claim 6 wherein the server closes communication with the network without issuing said response when an error prevents the server from issuing said response.

8. The method as defined in claim 2 wherein said step of testing said peripheral interface portion of the data path includes the steps of:
   issuing at least one setup command to the server to prepare the server for testing said peripheral interface portion;
   sending a test command to the server;
   determining whether said test command is valid; and
   testing said peripheral interface portion of the data path as specified by said test command when said test command is determined to be valid by the server.

9. The method as defined in claim 8 wherein said testing said peripheral interface portion includes transmitting test data generated by the at least one peripheral device to the server and measuring the amount of time required for the server to receive a specified number of bytes of said test data from the peripheral device.

10. The method as defined in claim 9 wherein said test data transmitted from the peripheral device to the server is discarded by the server once said test data are received by the server.

11. The method as defined in claim 8 wherein said at least one setup command is sent from the network to the server via said at least one opened data connection, said test command is sent from the network to the server via said at least one opened test connection, and said status report is sent by the server to network also via said opened test connection.

12. The method as defined in claim 11 wherein said test connection is opened through at least one connection of a plurality of connections in a test port provided on said network interface portion of the server, and said data connection is established through at least one data port provided on said network interface portion of the server.

13. The method as defined in claim 8 wherein the server cancels said step of testing said peripheral interface portion when the network issues a command to the server to cancel said testing of said peripheral interface portion.

14. The method as defined in claim 13 wherein said cancel command is issued to the server via said at least one test connection.

15. A method for testing a data path of a server operably connected between at least one peripheral device and at least one client device via a network, the data path being adapted to transmit data between the peripheral device and the network as requested by the client device, said method comprising the steps of:

independently testing one of a peripheral interface portion of the data path and a network interface portion of the data path by opening at least one test connection between the network and the server; and establishing at least one data connection between the network and the server; and generating a status report indicating a result of said test;

wherein said step of testing said peripheral interface portion of the data path includes the steps of:

issuing at least one setup command to the server to prepare the server for testing said peripheral interface portion;

sending a test command to the server;

determining whether said test command is valid; and testing said peripheral interface portion of the data path as specified by said test command when said test command is determined to be valid by the server;

and wherein the server resets said step of testing said peripheral interface portion when the network issues a command to the server to reset said testing of said peripheral interface portion.

16. The method as defined in claim 15 wherein said command to reset is issued to the server via said at least one test connection.

17. The method as defined in claim 8 wherein the server generates said status report at any time after said step of opening said at least one data connection, when the network issues a command to the server to generate said status report.

18. The method as defined in claim 17 wherein said command to generate said status report is issued to the server via said at least one test connection.

19. The method as defined in claim 8 wherein said testing said peripheral interface portion includes measuring a speed at which the server opens and closes connections a specified number of times between the server and the at least one peripheral device.

20. The method as defined in claim 19 wherein said connections are multiple logical channel connections.

21. The method as defined in claim 2 wherein said step of testing said network interface portion of the data path comprises the steps of:

issuing at least one setup command to the server to prepare the server for testing said network interface portion;

sending a test command to the server;

determining whether said test command is valid; and testing said network interface portion of the data path as specified by said test command when said test command is determined to be valid by the server.

22. The method as defined in claim 21 wherein said testing said network interface portion includes transmitting test data generated by the server to the network and measuring the amount of time required for the network to receive a specified number of bytes of said test data from the server device.

23. The method as defined in claim 21 wherein said at least one setup command is sent from the network to the server via said at least one opened data connection, said test command is sent from the network to the server via said at least one opened test connection, and said status report is sent by the server to the network also via said opened test connection.

24. The method as defined in claim 23 wherein said test connection is opened through at least one connection of a plurality of connections in a test port provided on said network interface portion of the server, and said data connection is established through at least one data port provided on said network interface portion of the server.

25. The method as defined in claim 21 wherein the server cancels said step of testing said network interface portion when the network issues a command to the server to cancel said testing of said network interface portion.

26. The method as defined in claim 25 wherein said cancel command is issued to the server via said at least one test connection.

27. A method for testing a data path of a server operably connected between at least one peripheral device and at least one client device via a network, the data path being adapted to transmit data between the peripheral device and the network as requested by the client device, said method comprising the steps of:

independently testing one of a peripheral interface portion of the data path and a network interface portion of the data path by opening at least one test connection between the network and the server; and establishing at least one data connection between the network and the server; and generating a status report indicating a result of said test;

wherein said step of testing said network interface portion of the data path comprises the steps of:

issuing at least one setup command to the server to prepare the server for testing said network interface portion;

sending a test command to the server;

determining whether said test command is valid; and testing said network interface portion of the data path as specified by said test command when said test command is determined to be valid by the server;

and wherein the server resets said step of testing said network interface portion when the network issues a command to the server to reset said testing of said network interface portion.

28. The method as defined in claim 27 wherein said command to reset is issued to the server via said at least one test connection.

29. The method as defined in claim 21 wherein the server generates said status report at any time after said step of opening said at least one data connection, when the network issues a command to the server to generate said status report.

30. The method as defined in claim 29 wherein said command to generate said status report is issued to the server via said at least one test connection.

31. A peripheral server operably connected between at least one peripheral and at least client via a network for transmitting data between the peripheral and the client, said server comprising:
- a network interface adapted to connect the server to the network for transmitting data between the server and the network;
- a peripheral interface adapted to connect the server to the at least one peripheral for transmitting data between the server and the peripheral;
- at least one data path connected between said network interface and said peripheral interface for transmitting data between the at least one peripheral and the at least one client; and
- a firmware provided in said at least one data path and programmed to independently test a peripheral interface portion and a network interface portion of said data path, and to determine if the rate at which the server received data were faster than the rate at which it could transmit the data and thereby determine the existence of any bottleneck in a portion of the data path and to generate a status report indicating the result of said tests, in response to corresponding test commands received from the at least one client.

32. A peripheral server operably connected between at least one peripheral and at least one client via a network for transmitting data between the peripheral and the client, said server comprising:
- a network interface adapted to connect the server to the network for transmitting data between the server and the network;
- a peripheral interface adapted to connect the server to the at least one peripheral for transmitting data between the server and the peripheral;
- at least one data path connected between said network interface and said peripheral interface for transmitting data between the at least one peripheral and the at least one client; and
- a firmware provided in said at least one data path and programmed to independently test a peripheral interface portion and a network interface portion of said data path and to generate a status report indicating the result of said test, in response to corresponding test commands received from the at least one client;
- wherein said network interface is a TCP interface and/or SPX interface, and said peripheral interface is a bitronics interface.

33. A peripheral server operably connected between at least one peripheral and at least one client via a network for transmitting data between the peripheral and the client, said server comprising:
- a network interface adapted to connect the server to the network for transmitting data between the server and the network;
- a peripheral interface adapted to connect the server to the at least one peripheral for transmitting data between the server and the peripheral;
- at least one data path connected between said network interface and said peripheral interface for transmitting data between the at least one peripheral and the at least one client; and
- a firmware provided in said at least one data path and programmed to independently test a peripheral interface portion and a network interface portion of said data path and to generate a status report indicating the result of said test, in response to corresponding test commands received from the at least one client;
- wherein said data path is a scan gateway for transmitting scan data from a scanning peripheral.

34. The server as defined in claim 31 further including at least one test connection for receiving said test commands and sending said status report to the client, and at least one data port for transmitting data between the server and the network.

35. The server as defined in claim 34 wherein said firmware generates said status report automatically at a conclusion of said test, and when a status report command is received from the at least one client via said test connection with respect to a specified data port.

36. A peripheral server operably connected between at least one peripheral and at least one client via a network for transmitting data between the peripheral and the client, said server comprising:
- a network interface adapted to connect the server to the network for transmitting data between the server and the network;
- a peripheral interface adapted to connect the server to the at least one peripheral for transmitting data between the server and the peripheral;
- at least one data path connected between said network interface and said peripheral interface for transmitting data between the at least one peripheral and the at least one client; and
- a firmware provided in said at least one data path and programmed to independently test a peripheral interface portion and a network interface portion of said data path and to generate a status report indicating the result of said test, in response to corresponding test commands received from the at least one client;
- said server further including at least one test connection for receiving said test commands and sending said status report to the client, and at least one data port for transmitting data between the server and the network;
- wherein said firmware generates said status report automatically at a conclusion of said test, and when a status report command is received from the at least one client via said test connection with respect to a specified data port; and
- wherein said firmware generates said status report of a currently running said test when said status report command is received during said currently running test, of a most recently completed test when no test is being run at the time said status report command is received and an empty status report when no said test have been run.

37. The server as defined in claim 34 wherein said firmware is further programmed to change a maximum segment size of data to be transferred through the network interface and the peripheral interface in accordance with a maximum segment size command received from the at least one client with respect to a specified data port.

38. The server as defined in claim 34 wherein said firmware is further programmed to cancel a currently running said test and generate said status report with respect to a specified data port when a cancel command is received from the at least one client to cancel said test in connection with said specified data port.

39. A peripheral server operably connected between at least one peripheral and at least one client via a network for transmitting data between the peripheral and the client, said server comprising:

- a network interface adapted to connect the server to the network for transmitting data between the server and the network;
- a peripheral interface adapted to connect the server to the at least one peripheral for transmitting data between the server and the peripheral;
- at least one data path connected between said network interface and said peripheral interface for transmitting data between the at least one peripheral and the at least one client; and
- a firmware provided in said at least one data path and programmed to independently test a peripheral interface portion and a network interface portion of said data path and to generate a status report indicating the result of said test, in response to corresponding test commands received from the at least one client;
- wherein said server further including at least one test connection for receiving said test commands and sending said status report to the client, and at least one data port for transmitting data between the server and the network;
- wherein said firmware is further programmed to reset a currently running said test on said at least one data port when a reset command is received from the at least one client, wherein said resetting said test includes closing said at least one test connection other than said at least one test connection through which said reset command is received, canceling said currently running said test, and setting a maximum segment size of data to be transmitted through said interface and peripheral networks to a default value.
- said peripheral interface portion and said network interface portions are independently being tested.

40. The server as defined in claim 34 wherein said firmware measures the amount of time required for said server to receive a specified number of bytes of data from the at least one peripheral via said peripheral interface when said peripheral interface portion is being tested.

41. The server as defined in claim 34 wherein said firmware generates a specified number of bytes of test data and sends said test data on said network interface to the network when said network interface portion is being tested.

42. The server as defined in claim 34 wherein said firmware measures a speed at which said peripheral network portion repeatedly opens and closes logical connections with the at least one peripheral, when said peripheral interface portion is being tested.

43. The server as defined in claim 34 wherein said server includes a plurality of said test connections, and said firmware is programmed to receive a plurality of instructions via said test connections and execute said instructions while said peripheral interface portion and said network interface portion are independently being tested.

* * * * *

UNITED STATES PATENT AND TRADEMARK OFFICE
CERTIFICATE OF CORRECTION

PATENT NO. : 6,618,360 B1
DATED : September 9, 2003
INVENTOR(S) : Dean L. Scoville et al.

It is certified that error appears in the above-identified patent and that said Letters Patent is hereby corrected as shown below:

Column 17,
Line 7, after the second occurrence of "least" insert -- one --

Signed and Sealed this

Fifteenth Day of March, 2005

JON W. DUDAS
*Director of the United States Patent and Trademark Office*